(12) United States Patent
Lee et al.

(10) Patent No.: US 10,999,811 B2
(45) Date of Patent: May 4, 2021

(54) WIRELESS COMMUNICATION APPARATUS INCLUDING SYNCHRONIZATION SIGNAL DETECTOR AND CELL SEARCHING METHOD THEREOF

(71) Applicant: SAMSUNG ELECTRONICS CO., LTD., Suwon-si (KR)

(72) Inventors: Hae-Chul Lee, Yongin-si (KR); Sung-Yoon Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/544,089

(22) Filed: Aug. 19, 2019

(65) Prior Publication Data
US 2020/0245277 A1    Jul. 30, 2020

(30) Foreign Application Priority Data
Jan. 24, 2019    (KR) .................. 10-2019-0009229

(51) Int. Cl.
*H04W 56/00* (2009.01)
*H04W 4/80* (2018.01)
*H04W 72/04* (2009.01)

(52) U.S. Cl.
CPC .......... *H04W 56/005* (2013.01); *H04W 4/80* (2018.02); *H04W 56/001* (2013.01); *H04W 72/0446* (2013.01)

(58) Field of Classification Search
CPC ... H04W 4/80; H04W 56/001; H04W 56/005; H04W 72/0446
See application file for complete search history.

(56) References Cited

U.S. PATENT DOCUMENTS

| | | | |
|---|---|---|---|
| 8,576,810 B2 | 11/2013 | Yi | |
| 9,432,922 B1 | 8/2016 | Song et al. | |
| 9,467,261 B2* | 10/2016 | Papasakellariou | ........ H04L 1/08 |
| 9,479,218 B2 | 10/2016 | Li | |
| 9,820,159 B2 | 11/2017 | Ghasemzadeh et al. | |
| 9,999,015 B2 | 6/2018 | Seo et al. | |
| 10,045,325 B2 | 8/2018 | Yoon et al. | |
| 10,057,868 B2 | 8/2018 | Lin et al. | |

(Continued)

*Primary Examiner* — Saad A. Waqas
(74) *Attorney, Agent, or Firm* — F. Chau & Associates, LLC

(57) ABSTRACT

A wireless communication method includes: receiving a wireless signal including a plurality of frames, wherein each of the plurality of frames includes a plurality of sub-frames and a current frame is initially a first one of the frames; a) performing a correlation calculation between each of the sub-frames of the current frame and each a plurality of reference signals to generate a plurality of current correlation values; b) respectively accumulating the current correlation values with previous correlation values to generate cumulative values respectively corresponding to the plurality of sub-frames of the current frame; determining whether an effective synchronization signal is detected, based on the current cumulative values; and setting the current frame to a next one of the frames, setting the previous correlational values to the current correlation values, and determining whether to resume to step a) based on the determination as to whether the effective synchronization signal is detected.

17 Claims, 15 Drawing Sheets

(56) References Cited

U.S. PATENT DOCUMENTS

| | | | |
|---|---|---|---|
| 2007/0098100 A1* | 5/2007 | Charbit | H04L 27/2655 375/260 |
| 2009/0232125 A1* | 9/2009 | Kim | H04L 5/005 370/350 |
| 2012/0231790 A1* | 9/2012 | Lindoff | H04W 48/16 455/434 |
| 2013/0176991 A1* | 7/2013 | Yi | H04W 56/00 370/336 |
| 2014/0171097 A1* | 6/2014 | Fischer | G01S 5/0242 455/456.1 |
| 2014/0314128 A1* | 10/2014 | Li | H04B 1/709 375/150 |
| 2015/0036519 A1* | 2/2015 | Kazmi | H04L 5/14 370/252 |
| 2015/0198696 A1* | 7/2015 | Liu | G01S 5/10 370/329 |
| 2017/0034798 A1 | 2/2017 | Lin et al. | |
| 2017/0135052 A1* | 5/2017 | Lei | H04J 13/0062 |
| 2018/0324722 A1* | 11/2018 | Vos | H04W 56/001 |
| 2019/0028982 A1* | 1/2019 | Isaacs | H04W 56/001 |
| 2019/0124586 A1* | 4/2019 | Sahin | H04B 17/382 |

\* cited by examiner

WIRELESS COMMUNICATION APPARATUS INCLUDING SYNCHRONIZATION SIGNAL DETECTOR AND CELL SEARCHING METHOD THEREOF

CROSS-REFERENCE TO RELATED APPLICATION

This U.S. non-provisional patent application claims the benefit of priority to Korean Patent Application No. 10-2019-0009229, filed on Jan. 24, 2019, in the Korean Intellectual Property Office, the disclosure of which is incorporated by reference in its entirety herein.

BACKGROUND

1. Technical Field

The inventive concept relates to a wireless communication device and a cell searching method thereof, and more particularly, to a wireless communication device including a synchronization signal detector and a cell searching method of the wireless communication device.

2. Discussion of Related Art

In a wireless communication system including several cells, synchronization signals are used by a user terminal to search for or communicate with one of these cells. In a mobile communication system such as long term evolution (LTE) or $5^{th}$ generation (5G), the user terminal may detect synchronization signals that are broadcast from a base station and thus may identify cells formed by the base station.

The Internet of things (IoT) is the extension of Internet connectivity into physical devices and everyday objects. Various communication systems have been developed for IoT devices. For example, in a global system for mobile communications (GSM) or an LTE network, NarrowBand-Internet of Things (NB-IoT) supports a broadband service by using a narrowband operating in an extremely weak electric field. Accordingly, there is an increasing demand for quick cell searching in a low signal-to-noise ratio (SNR).

SUMMARY

At least one embodiment of the inventive concept provides a cell searching method of a wireless communication device, the method detecting synchronization signals based on a varying number of accumulations.

According to an exemplary embodiment of the inventive concept, there is provided a method of operating a wireless communication device, the method including: receiving a wireless signal including a plurality of frames, wherein each of the plurality of frames includes a plurality of sub-frames, and current frame is initially a first one of the frames; a) performing a correlation calculation between each of the sub-frames of the current frame and reference signals to generate a plurality of current correlation values; b) respectively accumulating the current correlation values with previous correlation values to generate current cumulative values respectively corresponding to the plurality of sub-frames of the current frame; determining whether an effective synchronization signal is detected, based on the current cumulative values; and setting the current frame to a next one of the frames, setting the previous correlational values to the current correlation values, and determining whether to resume to step a) based on the determination as to whether the effective synchronization signal is detected.

According to an exemplary embodiment of the inventive concept, there is provided a cell searching method of a wireless communication device including: receiving a wireless signal in which occurrence of each of a narrow primary synchronization signal (NPSS) and a narrow secondary synchronization signal (NSSS) is defined at preset time intervals; setting a first maximum number of accumulations regarding an operation of accumulating NPSS correlation values, wherein the wireless signal includes a first frame and a second frame which respectively include a plurality of sub-frames; calculating first NPSS correlation values by performing an NPSS correlation calculation between each sub-frame of the first frame and a plurality of NPSS reference signals; respectively accumulating the first NPSS correlation values with previous NPSS correlation values to generate first cumulative values; determining whether an effective NPSS is detected based on the first cumulative values; and when a first number of accumulations, which is obtained when the first NPSS correlation values are respectively accumulated to generate the first cumulative values, is less than the first maximum number of accumulations, obtaining frame boundary information from the effective NPSS when the effective NPSS is detected.

According to an exemplary embodiment of the inventive concept, there is provided a wireless communication device including: an antenna receiving a wireless signal including a plurality of frames in which occurrence of each of a narrow primary synchronization signal (NPSS) and a narrow secondary synchronization signal (NSSS) is defined at preset time intervals, wherein each of the plurality of frames includes a plurality of sub-frames; an NPSS correlator configured to output NPSS correlation values by performing an NPSS correlation calculation on a current frame among the frames, based on the plurality of sub-frames of the current frame and NPSS reference signals; an NPSS combiner configured to respectively accumulate the NPSS correlation values to generate first cumulative values respectively corresponding to the plurality of sub-frames of the current frame; and an NPSS controller configured to determine, based on the first cumulative values, whether an effective NPSS is detected, and output a control signal for controlling the NPSS correlator, based on the determination as to whether the effective NPSS is detected.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EXEMPLARY EMBODIMENTS

Hereinafter, one or more exemplary embodiments of the inventive concept will be described in detail with reference to the attached drawings.

Figure 1:
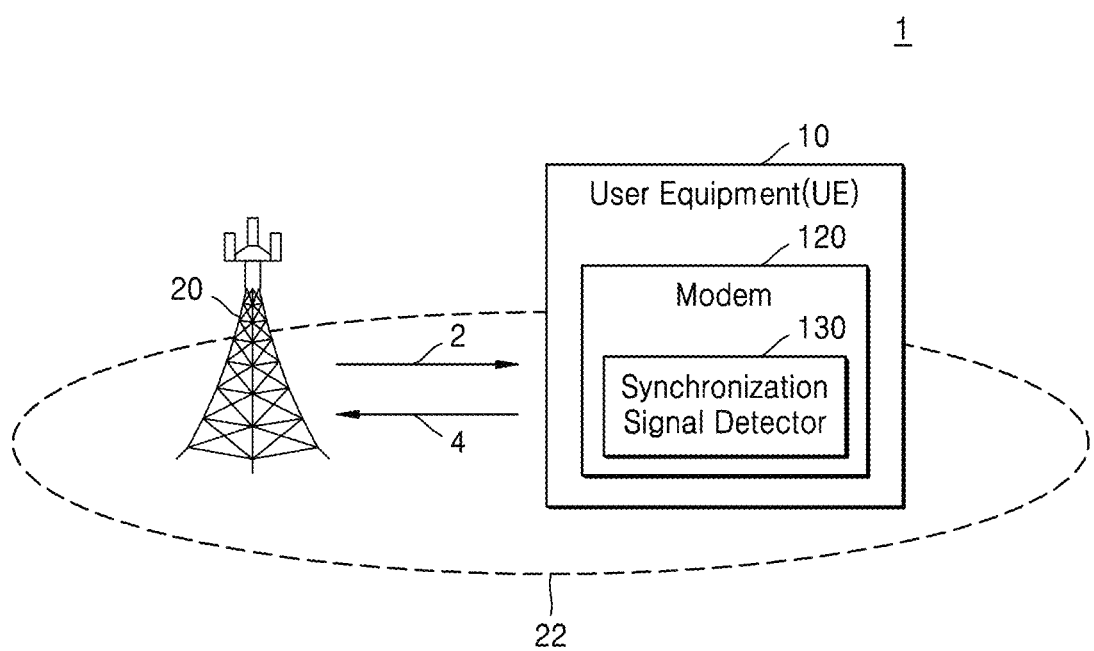
FIG. 1 is a block diagram of a wireless communication system according to an exemplary embodiment of the inventive concept.

FIG. 1 is a block diagram of a wireless communication system 1 according to an exemplary embodiment of the inventive concept. Referring to FIG. 1, the wireless communication system 1 includes user equipment 10 and a base station 20.

The base station 20 may communicate with the user equipment 10 in a wireless manner via at least one base station antenna. For example, the base station 20 and the user equipment 10 may communicate with each other via a downlink (DL) channel 2 and an uplink UL channel 4. For example, the user equipment 10 may download data from the base station 20 using the DL channel 2 and upload data to the base station 20 using the UL channel 4. A wireless communication network between the base station 20 and the user equipment 10 may support communication between users by allowing available network resources to be shared. For example, via a wireless communication network, information may be transmitted in various manners such as code division multiple access (CDMA), frequency division multiple access (FDMA), time division multiple access (TDMA), orthogonal frequency division multiple access (OFDMA), and single carrier frequency division multiple access (SC-FDMA).

FIG. 1 shows one base station 20, but this is merely an example for convenience of explanation. The wireless communication system 1 may include various numbers of base stations 20. Also, the wireless communication system 1 may include different types of base stations (e.g., a macro base station, a micro base station, and/or a pico base station).

The base station 20 may be a communication coverage regarding certain geographical areas and may provide cells 22. In other words, the cells 22 may be service coverage areas provided by the base station 20. The user equipment 10 may search for the cells 22 provided by the base station 20 and may access the cells 22, thereby communicating with the base station 20. For example, the user equipment 10 may detect an appropriate cell by searching for the cells 22, may obtain a symbol and a frame timing of the cell, and may be synchronized with a carrier frequency.

In some embodiments, the base station 20 may be referred to as a base transceiver station (BTS), a radio base station, an access point (AP), a radio transceiver, a NodeB, an eNodeB (eNB), a Home NodeB, a Home eNodeB, or another term. However, terms denoting the base station 20 are not limited thereto.

The base station 20 may broadcast synchronization signals for cell searching of the user equipment 10. For example, the base station 20 may transmit, as wireless signals, synchronization signals including a narrow primary synchronization signal (NPSS) and a narrow secondary synchronization signal (NSSS). In detail, the base station 20 may transmit wireless signals including frames, and each frame may include sub-frames. The base station 20 may map an NPSS to at least one sub-frame of each frame in frame units. Also, in frame units, the base station 20 may map an NSSS to a sub-frame of each frame that is different from the sub-frame to which the NPSS is mapped. This mapping process will be described below in detail.

The user equipment 10 is a wireless communication device that is located at a fixed location or portable and may denote various devices capable of receiving/transmitting data and/or control information from/to the base station 20 by communicating with the base station 20. For example, the user equipment 10 may be referred to as terminal equipment, a mobile station (MS), a mobile terminal (MT), user terminal (UT), a subscriber station (SS), a wireless device, or a handheld device.

The user equipment 10 includes a modem 120. The modem 120 may perform various functions related to a wireless interface between the base station 20 and the user equipment 10. For example, the modem 120 may perform modulation regarding signals transmitted to the base station 20 and/or demodulation regarding signals received from the base station 20, and communication functions such as encoding and decoding required for communication with the base station 20.

In an exemplary embodiment, the modem 120 includes a synchronization signal detector 130. The synchronization signal detector 130 may be a hardware block (e.g., device) including an analog circuit and/or a digital circuit. Alternatively, the modem 120 may further include a processor, and the synchronization signal detector 130 may be a software block including instructions executed by the processor.

The synchronization signal detector 130 receives wireless signals output from the base station 20 and detects synchronization signals included in the wireless signals. In an exemplary embodiment, the synchronization signal detector 130 performs, in frame units, a correlation calculation between reference signals that are set in advance and each sub-frame included in a frame. The synchronization signal detector 130 accumulates correlation calculation results as first cumulative values respectively corresponding to the sub-frames and determines, based on the first cumulative values, whether an effective synchronization signal is detected.

Based on the determination as to whether the effective synchronization signal is detected, the synchronization signal detector 130 may determine whether to resume the correlation calculation. In an exemplary embodiment, the synchronization signal detector 130 sets a maximum number of accumulations to accumulate correlations as the first cumulative values, and when the effective synchronization signal is detected even though the number of accumulations as the first cumulative values is less than the maximum number of accumulations, the effective synchronization signal is detected as a synchronization signal for cell searching.

The synchronization signal detector 130 may compare the first cumulative values with an effectiveness determination threshold value to determine whether the effective synchronization signal is detected. In an exemplary embodiment, the synchronization signal detector 130 calculates an effectiveness determination threshold value based on the number of accumulations as the first cumulative values and determines whether an effective synchronization signal is detected, based on a comparison result obtained using the effectiveness determination threshold value and the first cumulative values. For example, the synchronization signal detector 130 may derive a first value based on a peak and a statistical value of the first cumulative values and compare the first value with the effectiveness determination threshold value, thus determining whether the effective synchronization signal is detected.

In an exemplary embodiment, the synchronization signal detector 130 detects an NPSS as a synchronization signal according to the above operations. For example, the user equipment 10 may find frame boundary information by using the detected NPSS. In addition, by using the detected NPSS, the user equipment 10 may further find frequency offset information to be reflected while an NSSS is detected. In an exemplary embodiment, the synchronization signal detector 130 detects an NSSS as a synchronization signal according to the above operations.

Figure 2:
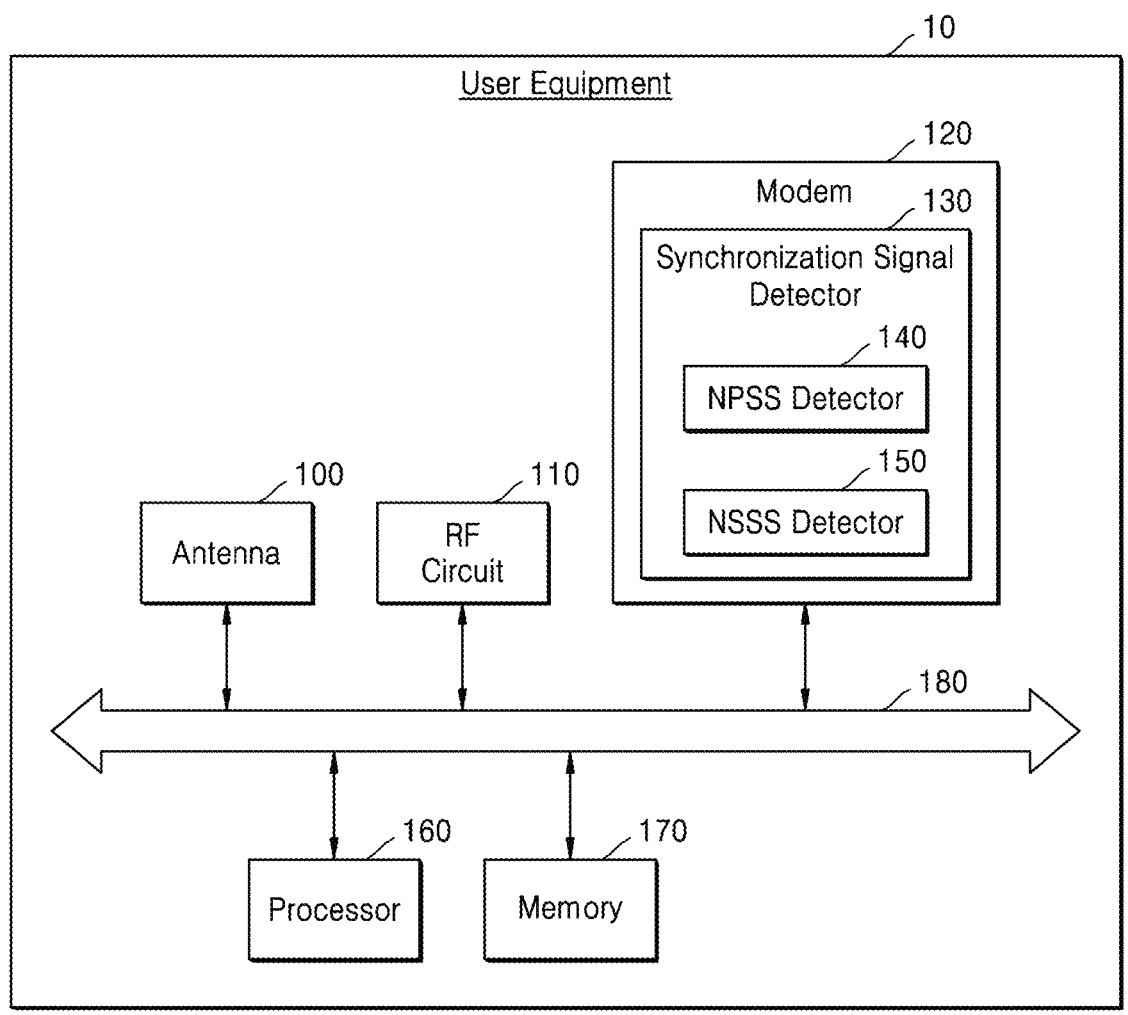
FIG. 2 is a block diagram of a structure of user equipment, according to an exemplary embodiment of the inventive concept.

FIG. 2 is a block diagram of a structure of user equipment, for example, the user equipment 10 of FIG. 1, according to an exemplary embodiment of the inventive concept.

Referring to FIG. 2, the user equipment 10 includes an antenna 100, a radio frequency (RF) circuit 110, the modem 120, a processor 160, a memory 170, and a system interconnect 180 (e.g., a data bus). Each component included in the user equipment 10 may be a hardware block including an analog circuit and/or a digital circuit or a software block including instructions executed by a processor.

The RF circuit 110 may receive wireless signals transmitted from the base station 20 through the antenna 100. For example, the RF circuit 110 may convert wireless signals in a frequency band of a high main frequency to a baseband and may output the wireless signals to the modem 120. In other words, the RF circuit 110 may demodulate the received wireless signals to enable the modem 120, the processor 160, or the memory 170 to process the same. Also, the RF circuit 110 may receive data from the modem 120 and may modulate the data, thereby transmitting the modulated data to the base station 20 through the antenna 100.

The processor 160 may include intelligent hardware devices such as a central processing unit (CPU), a microcontroller, an application processor (AP), and a graphics processing unit (GPU). The memory 170 may include volatile memory, for example, dynamic random access memory (DRAM) or synchronous dynamic random access memory (SRAM). In addition, the memory 170 may include non-volatile memory, for example, electrically erasable programmable read-only memory (EEPROM), flash memory, phase change random access memory (PRAM), resistance random access memory (RRAM), Nano Floating Gate Memory (NFGM), polymer random access memory (PoRAM), magnetic random access memory (MRAM), or ferroelectric random access memory (FRAM).

The memory 170 may store software code that is computer-readable and/or executable by a computer and includes instructions. For example, the memory 170 may store signal processing algorithms used for wireless signal processing.

The system interconnect 180 may include a bus to which a protocol having certain bus standards is applied. For example, advanced microcontroller bus architecture (AMBA) protocols developed by Advanced RISC Machine (ARM) may be applied as the bus standards. An advanced high-performance bus (AHB), an advanced peripheral bus (APB), an advanced eXtensible interface (AXI), AXI4, or AXI Coherency Extensions (ACE) may be included in bus types of the AMBA protocols.

In an exemplary embodiment, the synchronization signal detector 130 detects the NPSS and the NSSS based on wireless signals in which the occurrence of each of the NPSS and the NSSS received through the antenna 100 is defined at preset time intervals. The synchronization signal detector 130 includes an NPSS detector 140 and an NSSS detector 150. In an exemplary embodiment, the NPSS detector 140 performs an NPSS correlation calculation between each sub-frame and the NPSS reference signals in frame units and thus calculates NPSS correlation values. The NPSS detector 140 may respectively accumulate the calculated NPSS correlation values as the first cumulative values respectively corresponding to the sub-frames.

In frame units, the number of times that the NPSS correlation values are accumulated as the first cumulative values may increase. In an exemplary embodiment, the NPSS detector 140 sets the maximum number of accumulations regarding the above accumulation operation and performs the accumulation operation of accumulating the NPSS correlation values within a range less than or equal to the maximum number of accumulations.

The NPSS detector 140 may determine whether an effective NPSS is detected, based on the first cumulative values. In an exemplary embodiment, even though the number of accumulations, which is obtained when the NPSS correlation values calculated for the sub-frames of an arbitrary frame are respectively accumulated as the first cumulative values, is less than the maximum number of accumulations, an NPSS detection operation may be terminated since the effective NPSS is detected based on the first cumulative values. In other words, although the number of times that the accumulation operation is performed is less than the maximum number of accumulations, the NPSS detector 140 may detect an effective NPSS as an NPSS for cell searching since the effective NPSS is detected based on the first cumulative values. The NPSS detector 140 may obtain frame boundary information by using the detected NPSS. Also, the NPSS detector 140 may further obtain frequency offset information to be reflected while an NSSS is detected, by using the detected NPSS.

The NSSS detector 150 may detect an NSSS based on the frame boundary information obtained by using the NPSS detector 140. For example, the NSSS detector 150 may predict an NSSS location based on the frame boundary information obtained by using the NPSS detector 140 and may perform an NSSS correlation calculation between each sub-frame and the NSSS reference signals based on the predicted NSSS location, thereby calculating NSSS correlation values. The NSSS detector 150 may respectively accumulate the calculated NSSS correlation values as second cumulative values respectively corresponding to the sub-frames.

In frame units, the number of times that the NSSS correlation values are accumulated as the second cumulative values may increase. In an exemplary embodiment, the NSSS detector 150 sets the maximum number of accumulations regarding the accumulation operation and performs the accumulation operation of accumulating the NSSS correlation values within a range less than or equal to the maximum number of accumulations.

In an exemplary embodiment, the NSSS detector 150 determines whether an effective NSSS is detected based on the second cumulative values. In an example embodiment, although the number of accumulations, which is obtained when the NSSS correlation values calculated for the sub-frames of an arbitrary frame are respectively accumulated as the second cumulative values, is less than the maximum number of accumulations, an NSSS detection operation may be terminated since the effective NPSS is detected based on the second cumulative values. In other words, although the number of times that the accumulation operation is performed is less than the maximum number of accumulations, the NSSS detector 150 may detect an effective NSSS as an NSSS for cell searching since the effective NSSS is detected based on the second cumulative values. The NSSS detector 150 may obtain cell ID information by using the detected NSSS.

Figure 3:
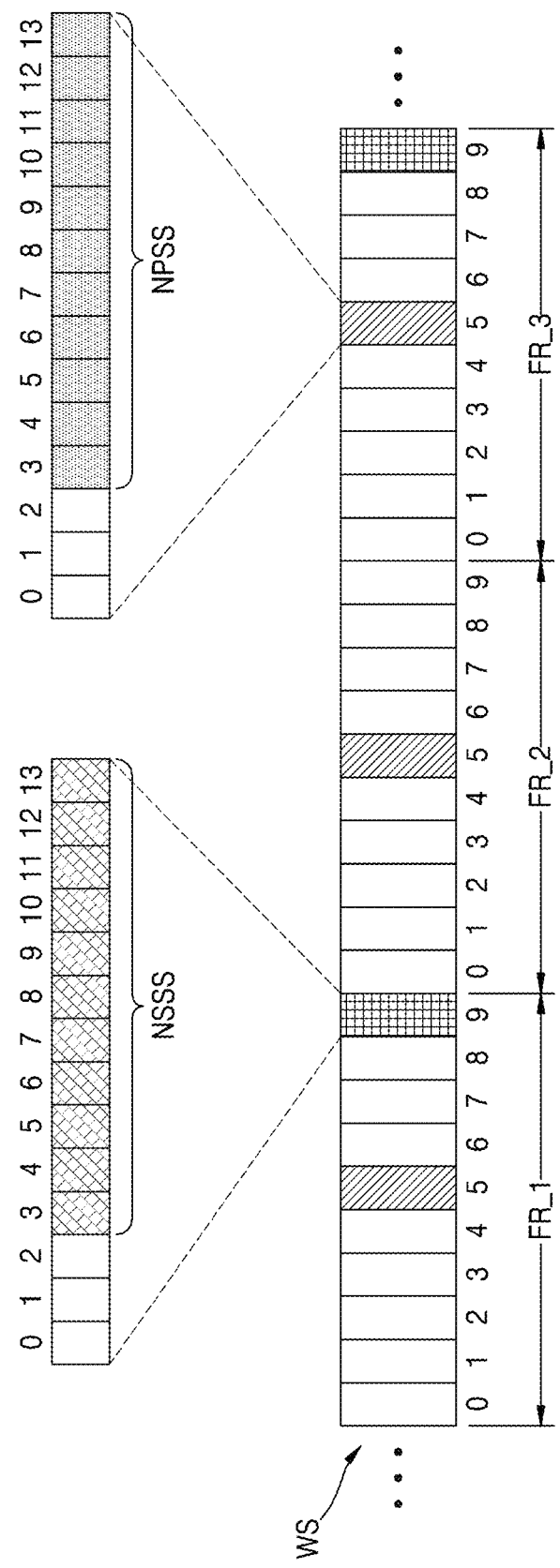
FIG. 3 is a diagram showing wireless signals in which a narrow primary synchronization signal (NPSS) and a narrow secondary synchronization signal (NSSS) are defined, according to an exemplary embodiment of the inventive concept.

FIG. 3 is a diagram showing wireless signals in which an NPSS and an NSSS are defined, according to an exemplary embodiment of the inventive concept.

Referring to FIG. 3, a wireless signal WS output from the base station 20 includes frames FR_1 to FR_3, and each of the frames FR_1 to FR_3 include sub-frames (e.g., sub-frames 0 to 9). In the wireless signal WS, the occurrence of each of the NPSS and the NSSS may be defined at preset time intervals. For example, the base station 20 may transmit the NPSS and the NSSS in a narrowband of a downlink system bandwidth.

In an exemplary embodiment, the NPSS is defined in the sub-frame 5 of each of the frames FR_1 to FR_3. In detail, each sub-frame may include symbols (e.g., symbols 0 to 13), and the NPSS may be defined in the symbols 3 to 13 of the sub-frame 5 of each of the frames FR_1 to FR_3. For example, the NPSS may be transmitted by using adjacent OFDM symbols (e.g., adjacent OFDM symbols in the sub-frame 5). In an exemplary embodiment, the NPSS is a sequence encoded in the base station 20 according to a Zadoff-Chu method.

In an exemplary embodiment, the NSSS is alternately defined in the sub-frame 9 of each frame (e.g., the frames FR_1 to FR_3). For example, an NSSS could be present in the first frame FR1, absent from the second frame FR2, and present in the third frame FR3. In detail, the NSSS may be defined in the symbols 3 to 13 of the sub-frame 9 of each frame. For example, the NSSS may be transmitted by using adjacent OFDM symbols (e.g., adjacent OFDM symbols in the sub-frame 9). In an exemplary embodiment, the NSSS may be a sequence that is encoded in the base station 20 according to at least one of a Zadoff-Chu method, a Hadamard method, and a phase rotation method.

Figure 4:
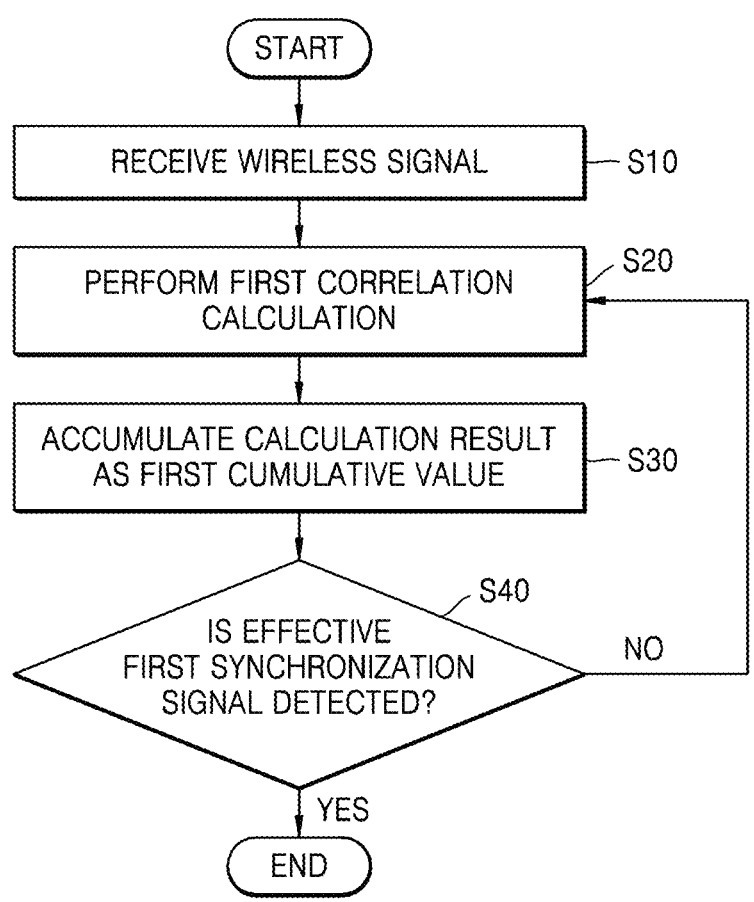
FIG. 4 is a flowchart of a method of operating user equipment, according to an exemplary embodiment of the inventive concept.

FIG. 4 is a flowchart of a method of operating user equipment, according to an exemplary embodiment of the inventive concept. For example, FIG. 4 shows part of a cell searching method of the user equipment 10 of FIG. 2.

Referring to FIG. 4, in operation S10, the user equipment 10 receives the wireless signal WS including frames through the antenna 100. For example, each frame included in the wireless signal WS may include sub-frames, and a first synchronization signal may be defined for cell searching in at least one of the sub-frames. For example, at least one of the NPSS and the NSSS may be defined as the first synchronization signal in at least one of the sub-frames. For example, the modem 120 may periodically sample a received wireless signal to retrieve data representing a frame of a wireless signal WS, divide the retrieved data into sections corresponding to the sub-frames, and store the sections in an internal buffer or memory 170 so a later correlation calculation can be performed on each section.

Next, in operation S20, the user equipment 10 performs a first correlation calculation between each sub-frame and the first reference signals in frame units. The first reference signals may be set in advance in the synchronization signal detector 130 for the first correlation calculation. For example, the first correlation calculation may be performed on each of the above-described sections of a first frame with respect to a corresponding one of the first reference signals to generate first correlation values associated with the first frame.

In operation S30, the user equipment 10 accumulates a first correlation calculation result as each first cumulative value. Each first cumulative value may correspond to each sub-frame of a frame and may be a value used to accumulate the correlation values obtained according to the first correlation calculation. For example, when the wireless signal WS is a wireless signal that has a relatively weak electric field, the synchronization signal detector 130 may accumulate the correlation values and thus distinguish the first synchronization signal from noise. The first cumulative values may be generated by adding the first correlation values respectively to previous correlation values. However, when operation S20 has only been performed once, the first cumulative values are the same as the first correlation values, and the previous correlation values can be set to the first correlation values.

In operation S40, the user equipment 10 determines whether an effective first synchronization signal is detected based on the first cumulative values. Based on the determination as to whether the effective first synchronization signal is detected, the user equipment 10 determines whether to resume the first correlation calculation performed in operation S20. For example, when an effective first synchronization signal is not detected, the user equipment 10 resumes to operation S20.

For example, after performing operation S20 on the first frame and the first effective synchronization signal is not detected, operation S20 can be performed on the second frame to generate second correlation values. For example, the second frame would be divided into sections corresponding it its respective sub-frames for correlating these sections against the reference signals to generate the second correlation values. Then, operation S30 would result in the previous correlation values (i.e., the first correlation values) being added respectively to the second correlation values to generate updated cumulative values. For example, the correlation value associated with the first sub-frame of the first frame would be added to the correlation value associated with the first sub-frame of the second frame, the correlation value associated with the second sub-frame of the first frame would be added to the correlation value associated with the second sub-frame of the second frame, etc. Then, operation S40 would be operated on the updated cumulative values to determine whether an effective first synchronization signal is detected.

In an exemplary embodiment, the user equipment 10 sets the maximum number of accumulations and performs the accumulation operation in operation S30 within a range of the maximum number of accumulations. In other words, when an effective first synchronization signal is not detected in operation S40, the user equipment 10 may repeatedly perform operations S20 and S30 within the range of the maximum number of accumulations.

In an exemplary embodiment, when the number of times that the accumulation operation in operation 30 is performed is less than the maximum number of accumulations, and when the effective first synchronization signal is detected in operation S40, the user equipment 10 detects the effective first synchronization signal as a first synchronization signal for cell searching and may perform cell searching based on the detected first synchronization signal. In other words, because the effective first synchronization signal is detected even though the number of times that the accumulation operation in operation 30 is performed is less than the maximum number of accumulations, the user equipment 10 may detect the first synchronization signal without additionally performing operations S20 and S30. For example, if the maximum number of accumulations is 3 and the system is able to detect an effective first synchronization signal from the first two frames, it does not need to perform operations S20 and S30 on the third frame.

As described above, according to at least one embodiment of the inventive concept, during the cell searching, the user equipment 10 may adaptively vary the number of times that the accumulation operation is performed and then may operate. Thus, the user equipment 10 may reduce a period of time taken to search for cells and an amount of consumed power. For example, instead of always performing the correlation calculation and the accumulation a fixed number of times, these steps can be performed only until an effective enough synchronization signal has been recognized.

Figure 5:
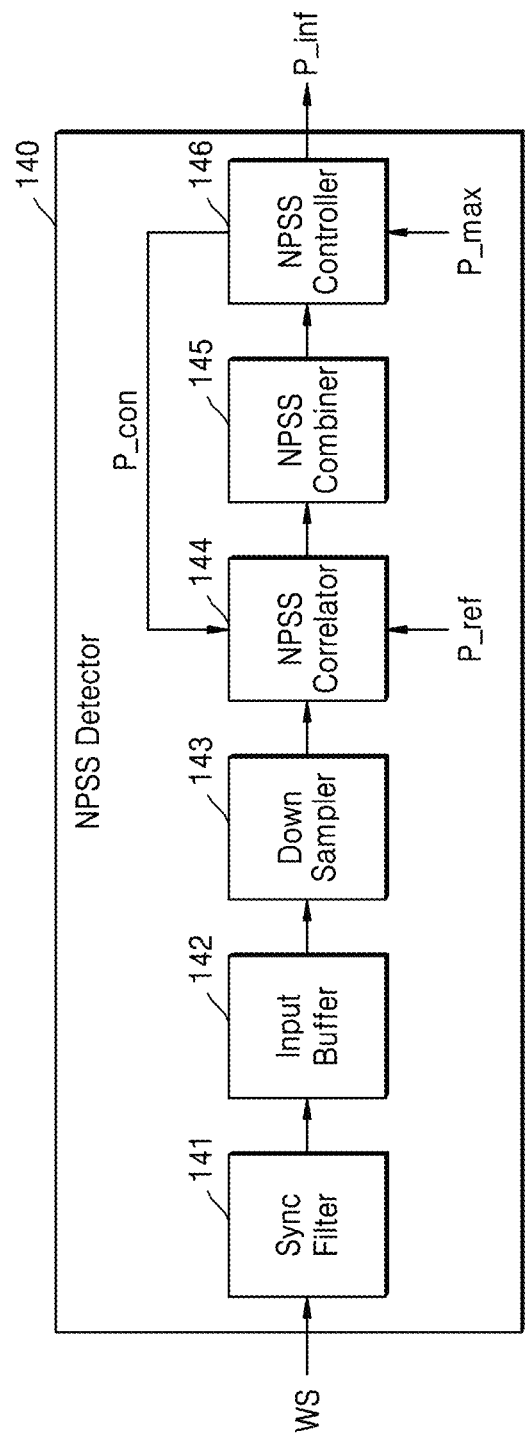
FIG. 5 is a block diagram of a structure of an NPSS detector, according to an exemplary embodiment of the inventive concept.

FIG. 5 is a block diagram of a structure of an NPSS detector, according to an exemplary embodiment of the inventive concept. For example, FIG. 5 shows a detailed structure of the NPSS detector 140 of FIG. 2.

Referring to FIG. 5, the NPSS detector 140 includes a synchronization filter 141, an input buffer 142, a down sampler 143, an NPSS correlator 144 (e.g., an analog circuit, a digital circuit, or software), an NPSS combiner 145 (e.g., an analog circuit, a digital circuit, or software), and an NPSS controller 146 (e.g., a control circuit). The synchronization filter 141 may remove, from the wireless signal WS, or control signals in a frequency band other than signals desired to receive (e.g., the synchronization signal). For example, the synchronization filter 141 may include a low pass filter. For example, the synchronization filter 141 may filter out undesirable frequency components from the wireless signal WS.

The input buffer 142 may buffer signals that are filtered by the synchronization filter 141. In an exemplary embodiment, the input buffer 142 samples the signals, which are filtered by the synchronization filter 141, at a certain sampling rate and stores the sampled signals.

The down sampler 143 may down-sample the signals stored in the input buffer 142 at a certain sampling rate. For example, the down sampler 143 may perform ⅛ down sampling on the signals stored in the input buffer 142 to generate down-sampled signals and may output the down-sampled signals to the NPSS correlator 144. However, this is merely an example, as a down sampling rate may vary. For example, the down sampler 143 could perform ¼, 1/10, etc. down sampling. For example, the number of the down-sampled signals may correspond to the number of the sub-frames.

The NPSS correlator 144 may perform an NPSS correlation calculation regarding down-sampled signals and NPSS reference signals P_ref that are set in advance. For example, the NPSS correlator 144 may perform the NPSS correlation calculation between each sub-frame and the NPSS reference signals P_ref in frame units and may output NPSS correlation values P_cor. In an exemplary embodiment, the NPSS correlator 144 performs the NPSS correlation calculation between each sub-frame and the NPSS reference signals P_ref according to at least one of a full-correlation, a symbol-based correlation, and a differential correlation. For example, the NPSS correlator 144 could perform an NPSS correlation calculation on one of the down-sampled signals and a corresponding one of the NPSS reference signals P_ref to generate an NPSS correlation value, and repeat this for each down-sampled signal to generate the NPSS correlation values P_cor.

The NPSS combiner 145 may accumulate the NPSS correlation values P_cor as first cumulative values P_ac and may output the first cumulative values P_ac to the NPSS controller 146. In an exemplary embodiment, under the control of the NPSS controller 146 according to the maximum number of accumulations P_max, a determination as to whether to perform the accumulation operation in the NPSS combiner 145 may be made. In other words, the NPSS combiner 145 may accumulate the NPSS correlation values P_cor as the first cumulative values P_ac within a number of times that are less than the maximum number of accumulations P_max.

For example, the first cumulative values P_ac respectively correspond to the sub-frames and may be used to repeatedly accumulate the NPSS correlation values. In an exemplary embodiment, when an effective NPSS is not detected based on the first cumulative values P_ac and when the number of accumulations is less than the maximum number of accumulations P_max, the operations of the NPSS correlator 144 and the NPSS combiner 145 may resume under the control of the NPSS controller 146.

For example, after the correlation calculation is performed by the NPSS correlator 144 according to the full correlation and then the accumulation operation is performed by the NPSS combiner 145, the operations of the NPSS correlator 144 and the NPSS combiner 145 may be expressed by the following [Equation 1].

$$\text{full\_corr}_c(t) = \sum_{c=0}^{C-1} \left( \frac{\left| \sum_{m=1}^{11} \sum_{n=0}^{N-1} (r_c(t + N_{sym}(m-1) + n) \cdot z_{m-1}^*(n))^2 \right|^2}{\sum_{m=1}^{11} \sum_{n=0}^{N-1} |r_c(t + N_{sym}(m-1) + n)|^2} \right) \quad \text{[Equation 1]}$$

In [Equation 1], $r_c(t)$ may indicate a wireless signal of a $c^{th}$ accumulation, $N_{sym}(m-1)$ may indicate an $(m-1)^{th}$ symbol value, and may indicate an NPSS reference signal corresponding to an $m^{th}$ symbol. In addition, C may indicate the maximum number of accumulations.

As another example, after the correlation calculation is performed by the NPSS correlator 144 according to the symbol-based correlation and then the accumulation operation is performed by the NPSS combiner 145, the operations of the NPSS correlator 144 and the NPSS combiner 145 may be expressed by the following [Equation 2].

$$\text{Sym\_Corr}_C(t) = \quad \text{[Equation 2]}$$

$$\sum_{c=0}^{C-1} \left( \frac{\sum_{m=1}^{m} \left( \left( \sum_{n=0}^{N-1} r_c(t + N_{sym}(m-1) + n) \cdot z_{m-1}^*(n) \right) \cdot \left( \sum_{n=0}^{N-1} r_c(t + N_{sym}m + n) \cdot z_m^*(n) \right)^* \right)}{\sum_{m=1}^{m} \sum_{n=0}^{N-1} |r_c(t + N_{sym}(m-1) + n)|^2} \right)$$

As another example, after the correlation calculation is performed by the NPSS correlator 144 according to the differential correlation and then the accumulation operation is performed by the NPSS combiner 145, the operations of the NPSS correlator 144 and the NPSS combiner 145 may be expressed by the following [Equation 3].

$$\rho_k(t) = \frac{1}{11-k} \sum_{m=1}^{11-k} \left( \sum_{n=0}^{N-1} r(t + N_{sym}(m-1) + n) \cdot z_{m-1}^*(n) \cdot r^*(t + N_{sym}(m-1+k) + n) \cdot z_{m-1+k}^*(n) \right) \quad \text{[Equation 3]}$$

$$\text{Diff\_Corr}_C(t) = \sum_{c=0}^{C-1} \left( \frac{\rho_1(t) \cdot |\rho_1(t)|}{\sum_{m=1}^{11} \sum_{n=0}^{N-1} |r_c(t + N_{sym}(m-1) + n)|^2} \right)$$

The NPSS controller 146 may determine whether an effective NPSS is detected, based on the first cumulative values P_ac. In an example embodiment, the NPSS controller 146 may output whether the effective NPSS is detected and control signals P_con for controlling the NPSS correlator 144 based on the maximum number of accumulations P_max.

For example, when an effective NPSS is detected based on the first cumulative values P_ac, the NPSS controller 146 may detect the NPSS as an NPSS for cell searching even though the number of accumulations is less than the maximum number of accumulations P_max and may output NPSS-related information P_inf. For example, the NPSS-related information P_inf may include frame boundary information and frequency offset information.

For example, when an effective NPSS is not detected based on the first cumulative values P_ac and when the number of accumulations is less than the maximum number of accumulations P_max, the NPSS controller 146 may output the control signals P_con to have the NPSS correlator 144 operate. Accordingly, when an effective NPSS is not detected from a certain frame, the NPSS controller 146 may resume the operations of the NPSS correlator 144 and the NPSS combiner 145 for a next frame.

Figure 6:
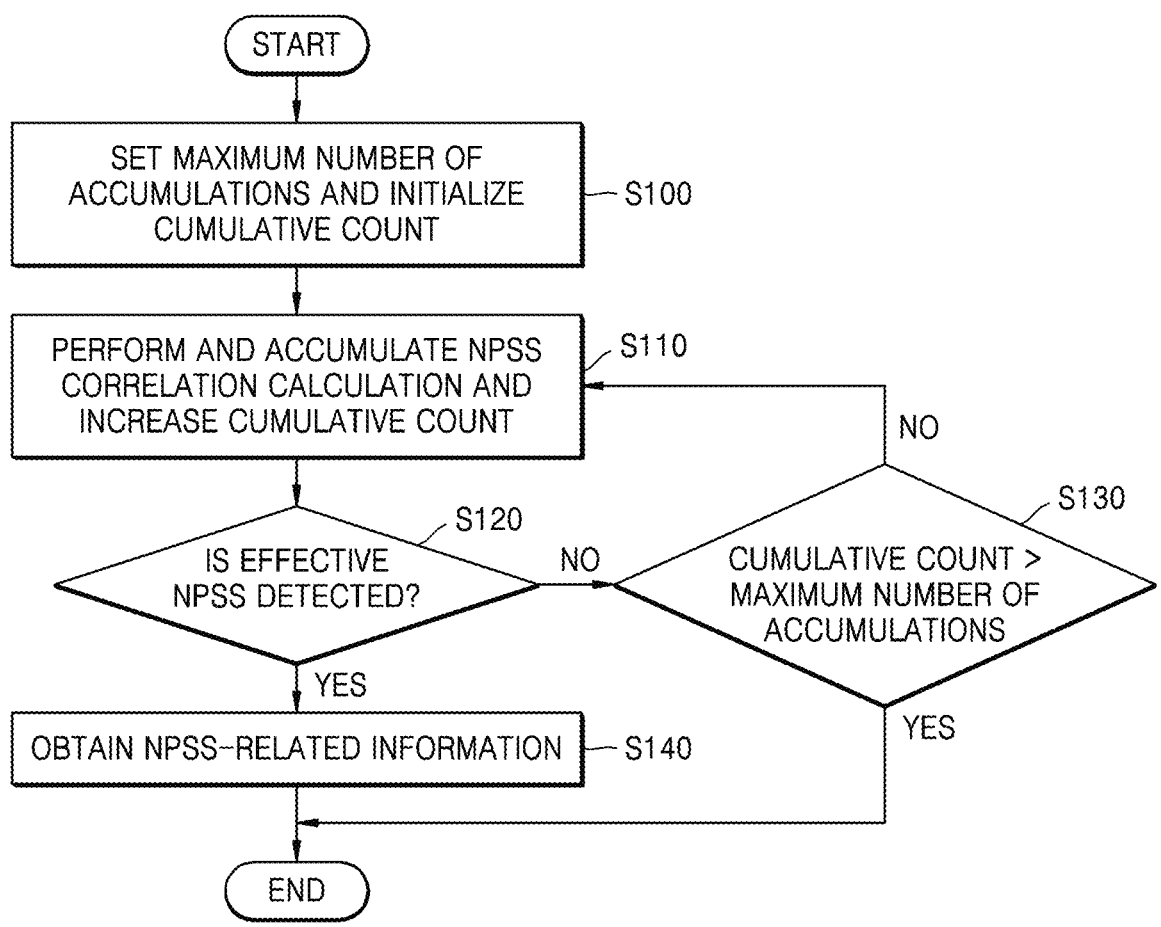
FIG. 6 is a flowchart of operations of an NPSS detector, according to an exemplary embodiment of the inventive concept.

FIG. 6 is a flowchart of operations of an NPSS detector, according to an exemplary embodiment of the inventive concept. For example, FIG. 6 shows part of the operations of the NPSS detector 140 of FIG. 5.

Referring to FIG. 6, in operation S100, the NPSS detector 140 sets the maximum number of accumulations P_max and initializes a cumulative count. For example, the cumulative count may be a variable for counting the number of times that the accumulation operation is performed by the NPSS combiner 145.

In operation S110, the NPSS detector 140 performs the NPSS correlation calculation between each sub-frame and the NPSS reference signals P_ref in frame units and accumulates NPSS correlation calculation results as the first cumulative values P_ac, thus increasing the cumulative count. The NPSS correlation calculation may be performed by the NPSS correlator 144 based on the NPSS reference signals P_ref, and the accumulation operation may be performed by the NPSS combiner 145 based on the NPSS correlation values P_cor. For example, the NPSS correlation calculation may be performed by the NPSS correlator 144 on the sub-frames of the first frame and the NPSS reference signals P_ref to generate the NPSS correlation values P_cor, and since this is the first time, the NPSS combiner 145 sets the first cumulative values P_ac to the NPSS correlation values P_cor, and the cumulative count is increased to one.

In operation S120, the NPSS detector 140 determines whether an effective NPSS is detected based on first cumulative values P_ac. Also, based on the determination as to whether the effective NPSS is detected, the NPSS detector 140 may determine whether to resume the NPSS correlation calculation and the accumulation operation.

For example, in operation S130, when an effective NPSS is not detected, the NPSS detector 140 determines whether a current cumulative count is equal to or greater than the maximum number of accumulations P_max. When the current cumulative count is equal to or greater than the maximum number of accumulations P_max, the NPSS detector 140 terminates an NPSS detection operation. Otherwise, when the current cumulative count is less than the maximum number of accumulations P_max, the NPSS detector 140 resumes to operation S110. For example, if the effective NPSS has not been detected from the cumulative values generated from the first frame and the current cumulative count is less than the maximum number, the NPSS correlation calculation may be performed by the NPSS correlator 144 on the sub-frames of the second frame and the NPSS reference signals P_ref to generate new NPSS correlation values. Since this is the second time, the NPSS combiner 145 would add the previous cumulative values to the new NPSS correlation values to generate new cumulative values, and the cumulative count would be increased to two.

For example, in operation S140, when the effective NPSS is detected, the NPSS detector 140 detects the effective NPSS as an NPSS for cell searching and obtains the NPSS-related information P_inf. The NPSS-related information P_inf may include information on which an NSSS detection operation of the synchronization signal detector 130 is based.

Figure 7:
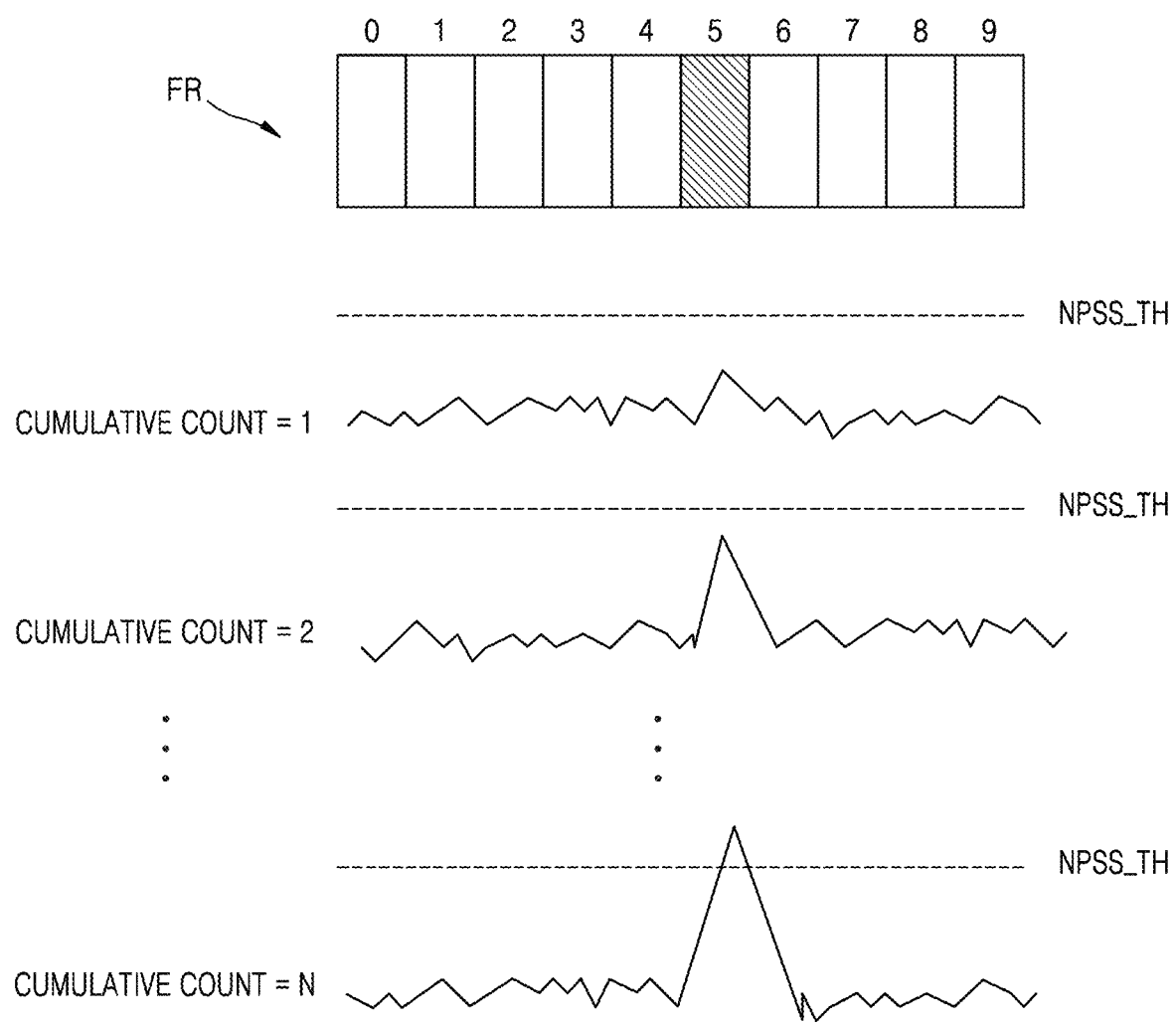
FIG. 7 is a concept diagram explaining first cumulative values and effective NPSS detection, according to an exemplary embodiment of the inventive concept.

FIG. 7 is a concept diagram explaining the first cumulative values and effective NPSS detection, according to an exemplary embodiment of the inventive concept.

Referring to FIG. 7, in units of frames FR, the NPSS correlation values are accumulated N times (where, N is a positive integer equal to or greater than 2). For example, the NPSS may be defined in a sub-frame 5, and the NPSS detector 140 may determine whether an effective NPSS is detected by comparing the first cumulative values with an effectiveness determination threshold value NPSS TH.

In an exemplary embodiment, the NPSS detector 140 derives a first value based on a peak of the first cumulative values and a statistical value regarding the first cumulative values in every cumulative count. In an exemplary embodiment, the NPSS detector 140 compares the first value with the effectiveness determination threshold value NPSS TH and determines whether the effective NPSS is detected based on the comparison.

For example, the statistical value of the first cumulative values may be a minimum value among the first cumulative values, and the first value may be a peak-to-min ratio. As another example, the statistical value of the first cumulative values may be an average value of the first cumulative values, and the first value may be a peak-to-average ratio.

In an exemplary embodiment, the NPSS detector 140 determines whether an effective NPSS is detected in response to a state in which a location of the peak of the first cumulative values is identically or similarly maintained during a certain cumulative count. In other words, when the location of the peak of the first cumulative values is identically or similarly maintained during the preset threshold number of accumulations, the NPSS detector 140 may determine the location of the peak as a location where the NPSS is defined. For example, if the preset threshold number of accumulations is 2, and the location of a peak is the fourth sub-frame during a first accumulation, the fifth sub-frame during a second accumulation, and then the fifth sub-frame again during a third accumulation, it can be concluded that the NPSS is defined in the fifth sub-frame.

Figure 8:
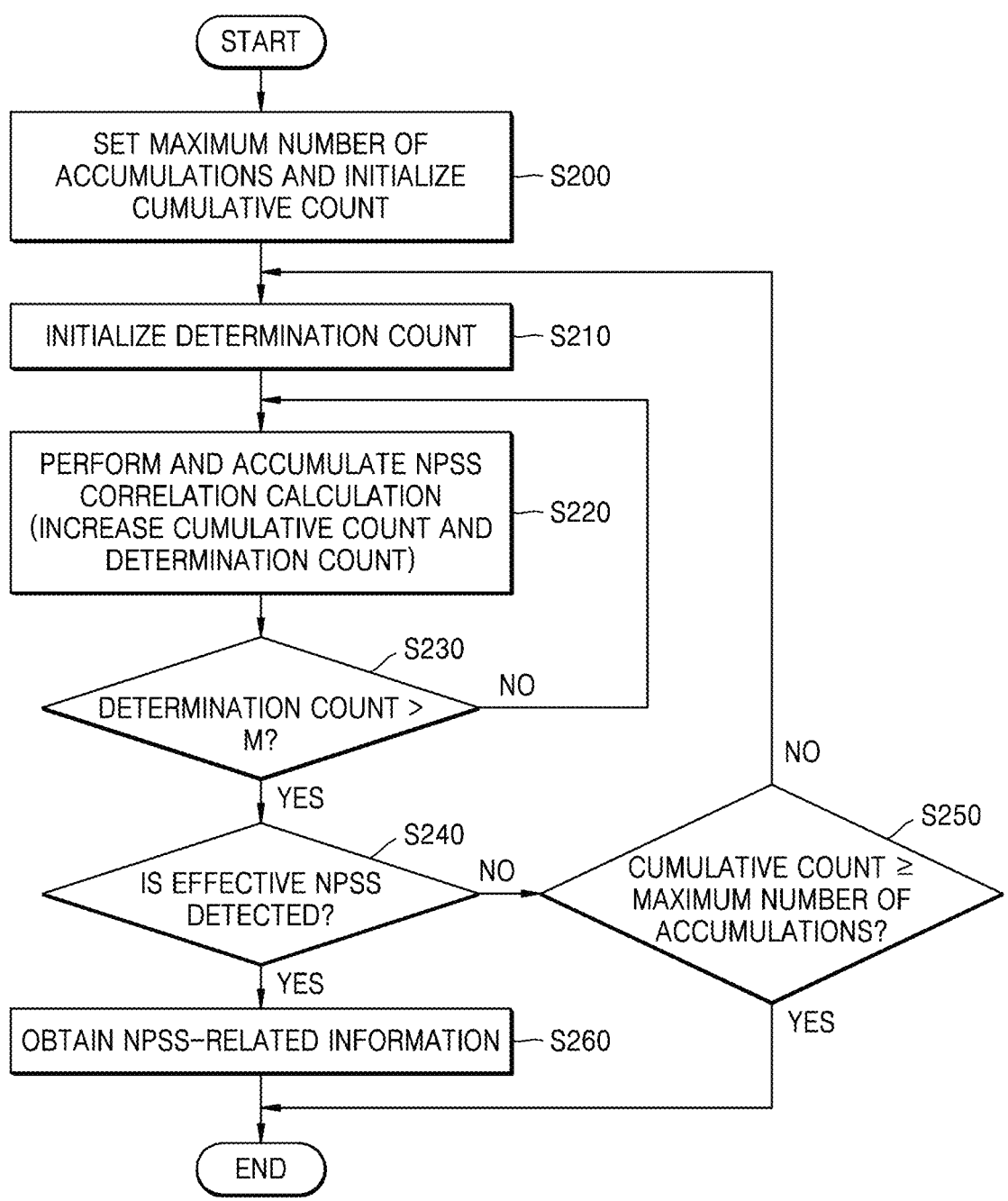
FIG. 8 is a flowchart of operations of an NPSS detector, according to an exemplary embodiment of the inventive concept.

FIG. 8 is a flowchart of operations of an NPSS detector, according to an exemplary embodiment of the inventive concept.

Referring to FIG. 8, in operation S200, the NPSS detector 140 sets the maximum number of accumulations P_max and initializes the cumulative count. Next, in operation S210, the NPSS detector 140 initializes a determination count. For example, the determination count may be a variable that is set to perform an effective NPSS detection operation after an NPSS correlation calculation and accumulation operations are performed at least two times. In other words, the NPSS detector 140 may consecutively perform the NPSS correlation calculation and accumulation operations M times (where, M is a positive integer equal to or greater than 2) and may determine whether an effective NPSS is detected based on the output first cumulative values. M may vary. For example, based on the determination as to whether the effective NPSS is detected, a value of M may adaptively change.

To make the determination, in operation S220, the NPSS detector 140 may perform the NPSS correlation calculation between each sub-frame and the NPSS reference signals P_ref in frame units and accumulate NPSS correlation calculation results as the first cumulative values P_ac, thereby respectively increasing the cumulative count and the determination count. Then, in operation S230, the NPSS detector 140 may determine whether the determination count is greater than M.

When the determination count is less than or equal to M, the NPSS detector 140 performs operation S220 again. In operation S240, when the determination count is greater than M, the NPSS detector 140 determines whether the effective NPSS is detected.

For example, in operation S240, when the effective NPSS is detected, the NPSS detector 140 may detect the effective NPSS as an NPSS for cell searching and may obtain the NPSS-related information P_inf. Otherwise, in operation S250, when an effective NPSS is not detected, the NPSS detector 140 determines whether the current cumulative count is equal to or greater than the maximum number of accumulations P_max. When the current cumulative count is equal to or greater than the maximum number of accumu-lations P_max, the NPSS detector 140 terminates the NPSS detection operation, and when the current cumulative count is less than the maximum number of accumulations P_max, the NPSS detector 140 resumes to operation S210.

Figure 9:
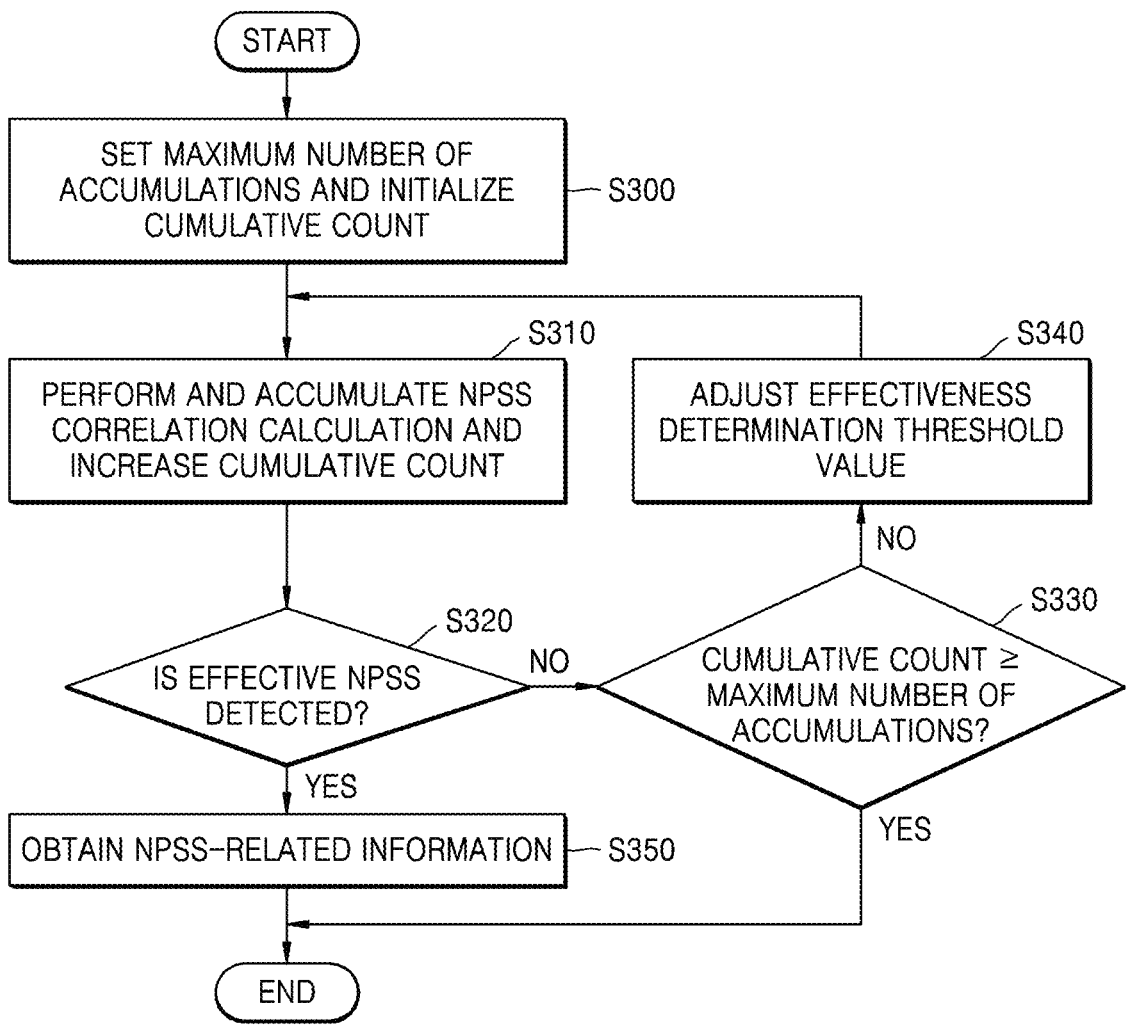
FIG. 9 is a flowchart of operations of an NPSS detector, according to an exemplary embodiment of the inventive concept.

FIG. 9 is a flowchart of operations of an NPSS detector, according to an exemplary embodiment of the inventive concept.

Referring to FIG. 9, in operation S300, the NPSS detector 140 sets the maximum number of accumulations P_max and initializes the cumulative count. Then, in operation S310, the NPSS detector 140 performs the NPSS correlation calculation between each sub-frame and the NPSS reference signals P_ref in frame units and accumulates NPSS correlation calculation results as the first cumulative values P_ac, thereby increasing the cumulative count. In operation S320, the NPSS detector 140 determines whether the effective NPSS is detected based on the first cumulative values P_ac. When the effective NPSS is detected, the NPSS detector 140 may detect the effective NPSS as an NPSS for cell searching and may obtain the NPSS-related information P_inf.

In operation S330, when an effective NPSS is not detected, the NPSS detector 140 determines whether the current cumulative count is equal to or greater than the maximum number of accumulations P_max. When the current cumulative count is equal to or greater than the maximum number of accumulations P_max, the NPSS detector 140 terminates the NPSS detection operation.

In operation S340, when the current cumulative count is less than the maximum number of accumulations P_max, the NPSS detector 140 adjusts an effectiveness determination threshold value on which the effective NPSS detection is based. In an exemplary embodiment, the NPSS detector 140 adjusts the effectiveness determination threshold value based on the cumulative count. For example, the NPSS detector 140 may set a size of the effectiveness determination threshold value to be smaller as the cumulative count increases. For example, if an effective NPSS has not been detected and the cumulative count has become equal to the maximum number of accumulations, the effectiveness determination threshold value may be reduced to increase the chances of finding an effective NPSS. For example, the adjustment of the effectiveness determination threshold value may be performed by the NPSS controller 146 based on the cumulative count.

In an exemplary embodiment, the NPSS detector 140 adjusts the effectiveness determination threshold value based on a false alarm ratio when the effective first synchronization signal is detected. In an exemplary embodiment the NPSS detector 140 adjusts the effectiveness determination threshold value based on channel information used to receive the wireless signal.

Figure 10:
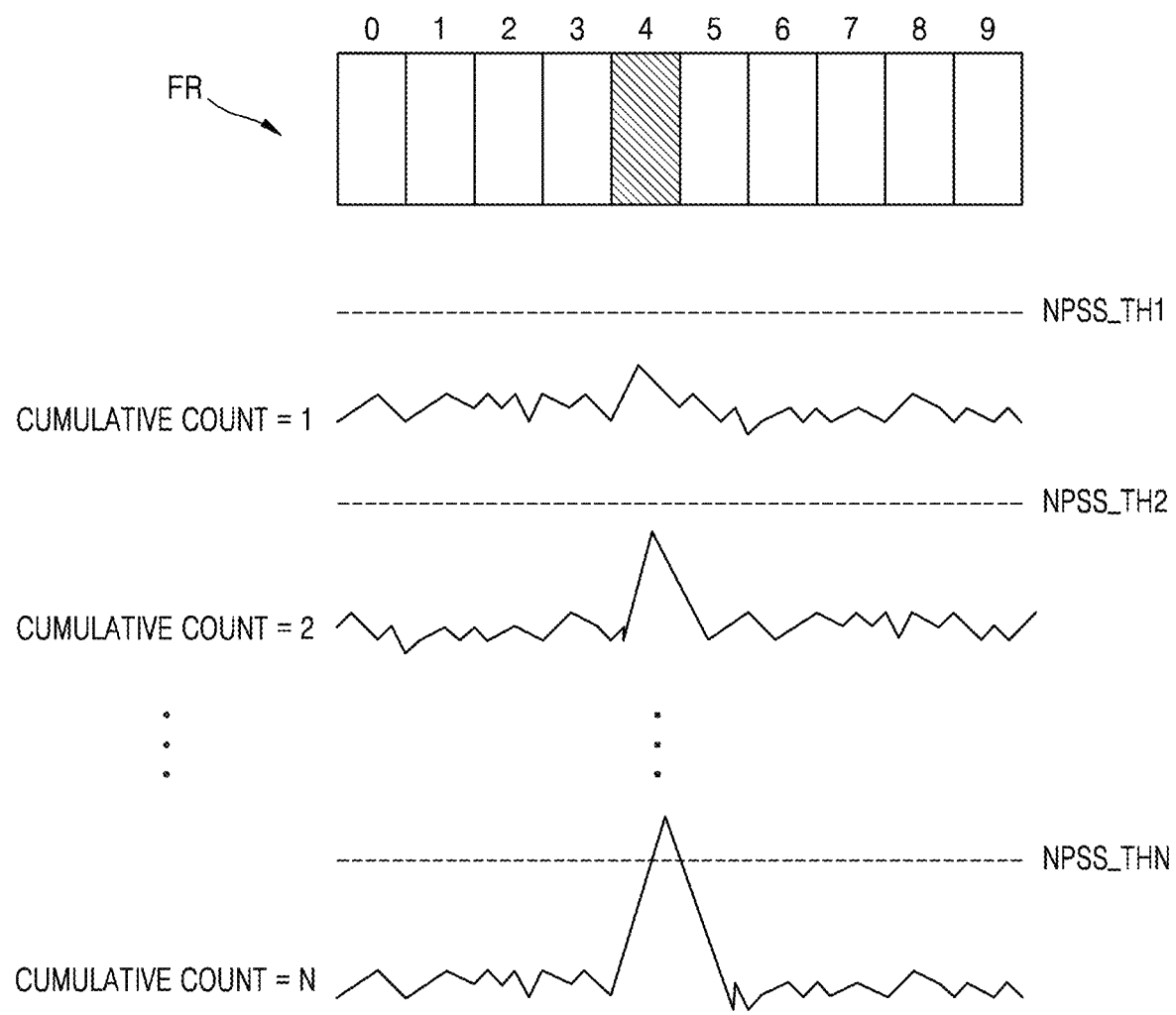
FIG. 10 is a concept diagram explaining first cumulative values and effective NPSS detection, according to an exemplary embodiment of the inventive concept.

FIG. 10 is a concept diagram explaining the first cumulative values and effective NPSS detection, according to an exemplary embodiment of the inventive concept.

Referring to FIG. 10, as the cumulative count increases, an effectiveness determination threshold value may change. For example, the NPSS detector 140 may set a first effectiveness determination threshold value NPSS_TH1 when the cumulative count is 1, a second effectiveness determination threshold value NPSS_TH2 when the cumulative count is 2, and an $N^{th}$ effectiveness determination threshold value NPSS_THN when the cumulative count is N.

In an exemplary embodiment, the second effectiveness determination threshold value NPSS_TH2 is less than or equal to the first effectiveness determination threshold value NPSS_TH1, and the $N^{th}$ effectiveness determination threshold value NPSS_THN is less than or equal to the second effectiveness determination threshold value NPSS_TH2. In other words, the NPSS detector 140 may adaptively decrease the effectiveness determination threshold value as the cumulative count increases.

In the present embodiment, it is described that the effectiveness determination threshold value changes in every cumulative count. However, this is merely an example as embodiments of the inventive concept are not limited thereto. For example, after the cumulative count increases by as much as a certain number that is equal to or greater than 2, the NPSS detector 140 may adaptively decrease the effectiveness determination threshold value.

Figure 11:
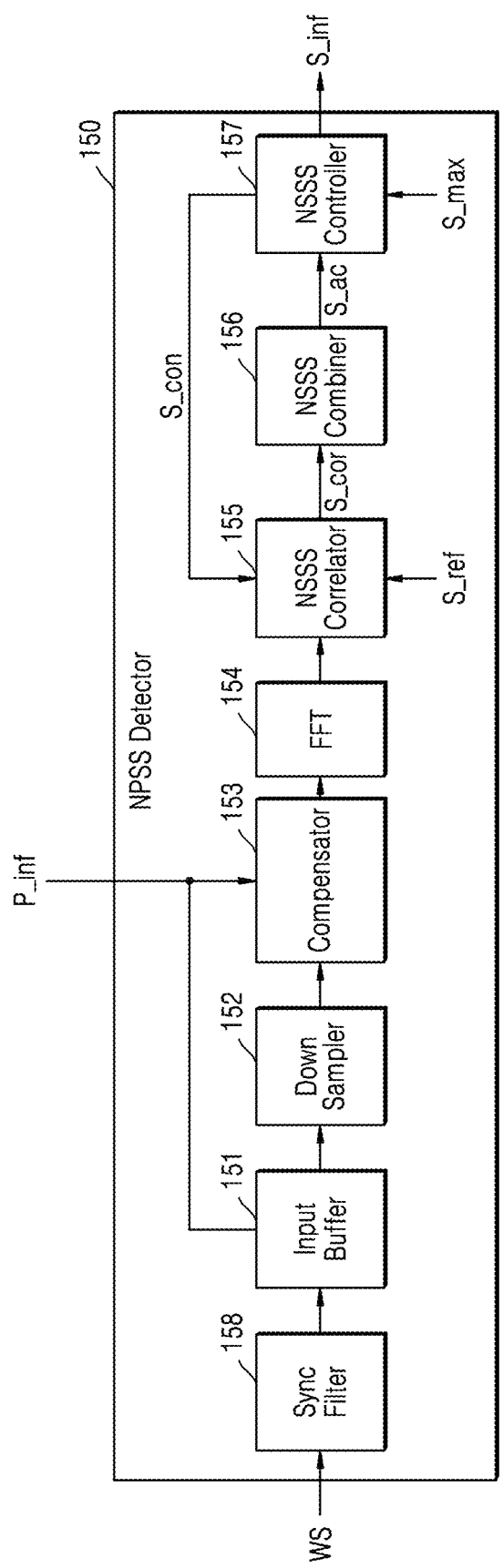
FIG. 11 is a block diagram of a structure of an NSSS detector, according to an exemplary embodiment of the inventive concept.

FIG. 11 is a block diagram of a structure of an NSSS detector, according to an exemplary embodiment of the inventive concept. For example, FIG. 11 shows a detailed structure of the NSSS detector 150 of FIG. 2.

Referring to FIG. 11, the NSSS detector 150 includes a synchronization filter 158, an input buffer 151, a down sampler 152, a compensator 153, a fast fourier transform (FFT) converter 154, an NSSS correlator 155, an NSSS combiner 156, and an NSSS controller 157. The synchronization filter 158 may remove, from the input wireless signal WS, or control signals in a frequency band other than signals that desire to receive. For example, the synchronization filter 158 may include a low pass filter. For example, the synchronization filter 158 may filter out certain frequency components from the input wireless signal WS. The input buffer 151 may predict an NSSS location based on the NPSS-related information P_inf (e.g., the frame boundary information) that is output from the NPSS detector 140 with regard to signals that are filtered by the synchronization filter 158. In an exemplary embodiment, the input buffer 151 samples, at a certain sampling rate, the signals that are filtered by the synchronization filter 158 and stores the sampled signals.

The down sampler 152 may down-sample the signals stored in the input buffer 151 at a certain sampling rate. For example, the down sampler 152 may perform ⅛ down-sampling on the signals stored in the input buffer 151 and may output the down-sampled signals to the compensator 153. However, this is merely an example as the down-sampling rate may vary.

The compensator 153 may compensate for the down-sampled signals based on the NPSS-related information P_inf output from the NPSS detector 140. For example, the NPSS-related information P_inf may include the frequency offset information, and the compensator 153 may perform a compensation operation on the down-sampled signals based on the frequency offset information. The FFT converter 154 may convert signals in a temporal area output from the compensator 153 into signals in a frequency area based on an FFT calculation.

The NSSS correlator 155 may perform the NSSS correlation calculation regarding FFT-converted signals and the NSSS reference signals S_ref that are set in advance. For example, the NSSS correlator 155 may perform the NSSS correlation calculation between each of candidate sub-frames, which are predicted as an NSSS location based on the NSSS detection, and the NSSS reference signals S_ref in frame units, thus outputting the NSSS correlation values S_cor. For example, the NSSS correlator 155 may perform the NSSS correlation calculation between each sub-frame and the NSSS reference signals S_ref, according to the full correlation.

The NSSS combiner 156 may accumulate the NSSS correlation values S_cor as the second cumulative values S_ac and may output the second cumulative values S_ac to the NSSS controller 157. In an exemplary embodiment, a determination as to whether the accumulation operation is performed by the NSSS combiner 156 is made under the control of the NSSS controller 157 according to the maximum number of accumulations S_max. In other words, the NSSS combiner 156 may accumulate the NSSS correlation values S_cor as the second cumulative values S_ac within the number of times that is less than the maximum number of accumulations S_max.

For example, the second cumulative values S_ac may respectively correspond to the sub-frames and may be used to repeatedly accumulate the NSSS correlation values S_cor.

In an exemplary embodiment, the operations of the NSSS correlator 155 and the NSSS combiner 156 resume under the control of the NSSS controller 157 when an effective NSSS is not detected based on the second cumulative values S_ac and when the number of accumulations is less than the maximum number of accumulations S_max.

For example, when the accumulation operation is performed by the NSSS combiner 156 after the correlation calculation is performed by the NSSS correlator 155 according to the full correlation, the operations of the NSSS correlator 155 and the NSSS combiner 156 may be expressed by the following [Equation 4].

$$\hat{u}, \hat{q}, \qquad \text{[Equation 4]}$$

$$\hat{\theta}_i = \underset{u,\theta_f,q}{\arg\max} \left\{ \sum_{c=0}^{C-1} \frac{\left| \sum_{n=0}^{131} \overline{Y}(n) \cdot e^{j2\pi\theta_i} \cdot b_q(m) e^{\frac{j\pi u(n'(n'+1))}{131}} \right|}{\sum_{n=0}^{131} |\overline{Y}_c(n)|} \right\}$$

In [Equation 4], $\overline{Y}(n)$ may indicate an FFT of a wireless signal, for example, 11 pieces of symbol data each including 12 sub-carriers.

$$b_q(m)e^{\frac{j\pi u(n'(n'+1))}{132}}$$

may indicate, for example, a signal indicating 504 cell IDs, and (u, q) may respectively indicate 132 Zadoff indices and 4 Hadamard matrix indices. For example, when $n_f$ is a frame index of 10 ms, $e^{j2\lambda\theta_f}$ is $$\theta_f = \frac{33}{132}(n_f/2) \bmod 4$$

and may indicate a signal indicating four frame boundary indices of 20 ms.

The NSSS controller 157 may determine whether an effective NSSS is detected based on the second cumulative values S_ac. In an exemplary embodiment, the NSSS controller 157 outputs a control signal S_con for controlling the NSSS correlator 155, based on the maximum number of accumulations S_max and the determination as to whether the effective NSSS is detected.

For example, when the effective NSSS is detected based on the second cumulative values S_ac, the NSSS controller 157 may detect the effective NSSS as an NSSS for cell searching even though the number of accumulations is less than the maximum number of accumulations S_max, and may output the NSSS-related information S_inf. For example, the NSSS-related information S_inf may include cell ID information and/or frequency boundary information (e.g., 80 ms boundary information).

For example, when an effective NSSS is not detected based on the second cumulative values S_ac and when the number of accumulations is less than the maximum number of accumulations S_max, the NSSS controller 157 may output the control signal S_con to drive the NSSS correlator 155. When an effective NSSS is not detected from a certain frame, the NSSS controller 157 may resume the operations of the NSSS correlator 155 and the NSSS combiner 156 for a next frame.

Figure 12:
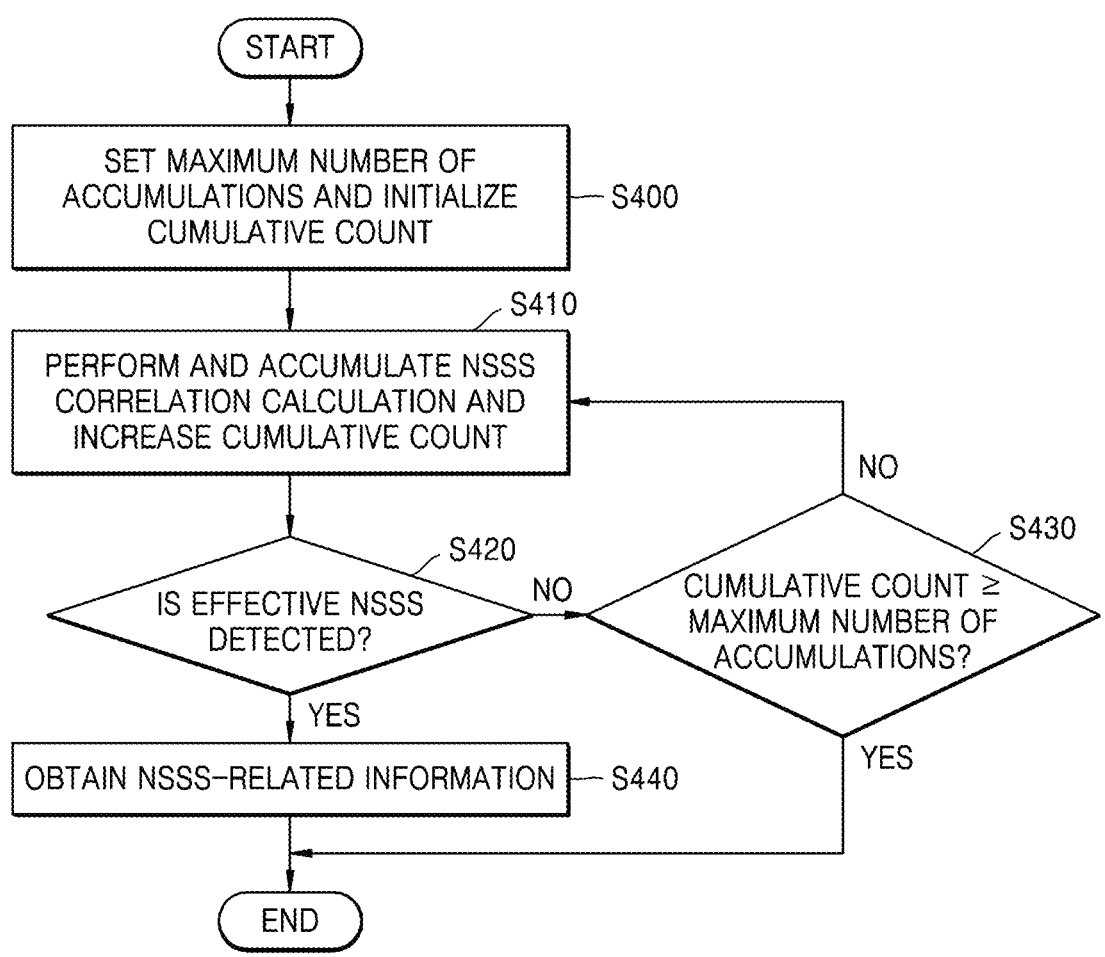
FIG. 12 is a flowchart of operations of an NSSS detector, according to an exemplary embodiment of the inventive concept.

FIG. 12 is a flowchart of operations of an NSSS detector, according to an exemplary embodiment of the inventive concept. For example, FIG. 12 shows part of the operations of the NSSS detector 150 of FIG. 11.

Referring to FIG. 12, in operation 400, the NSSS detector 150 sets the maximum number of accumulations S_max and initializes the cumulative count. For example, the cumulative count may be a variable for counting the number of times that the accumulation operation is performed by the NSSS combiner 156.

In operation S410, the NSSS detector 150 performs the NSSS correlation calculation between each sub-frame and the NSSS reference signals S_ref in frame units and accumulates the NSSS correlation calculation as the second cumulative values S_ac, thereby increasing the cumulative count. The NSSS correlation calculation may be performed by the NSSS correlator 155 based on the NSSS reference signals S_ref, and the accumulation operation may be performed by the NSSS combiner 156 based on the NSSS correlation values S_cor. For example, when the NSSS detector 150 performs the NSSS correlation calculation between each sub-frame of the first frame and the NSSS reference signals S_ref to generate second correlation values, since this is the first time, the second cumulative values S_ac are set to the second correlation values. For example, when the NSSS detector 150 next performs the NSSS correlation calculation between each sub-frame of the second frame and the NSSS reference signals S_ref to generate new second correlation values, since this is the second time, the new second correlation values are respectively added to the previous second cumulative values to generate new second cumulative values.

In operation S420, the NSSS detector 150 determines whether the effective NSSS is detected, based on the second cumulative values S_ac. Also, the NSSS detector 150 may determine whether to resume the NSSS correlation calculation and the accumulation operation, based on the determination as to whether the effective NSSS is detected.

In an exemplary embodiment, the NSSS detector 150 derives a second value based on a peak of the second cumulative values and a statistical value regarding the second cumulative values in every cumulative count. The NSSS detector 150 may compare the second value with the effectiveness determination threshold value to determine whether the effective NSSS is detected. In detail, the operations of the NSSS detector 150 may be similar to the operations of the NPSS detector 140 that are described with reference to FIG. 7.

For example, in operation S430, when an effective NSSS is not detected, the NSSS detector 150 determines whether a current cumulative count is equal to or greater than the maximum number of accumulations S_max. When the current cumulative count is equal to or greater than the maximum number of accumulations S_max, the NSSS detector 150 terminates the NSSS detection operation. Otherwise, when the current cumulative count is less than the maximum number of accumulations S_max, the NSSS detector 150 resumes to operation S410.

In operation S440, for example, when the effective NSSS is detected, the NSSS detector 150 detects the effective NSSS as an NSSS for cell searching and may obtain NSSS-related information S_inf. For example, the NSSS-related information S_inf may include cell ID information.

Figure 13:
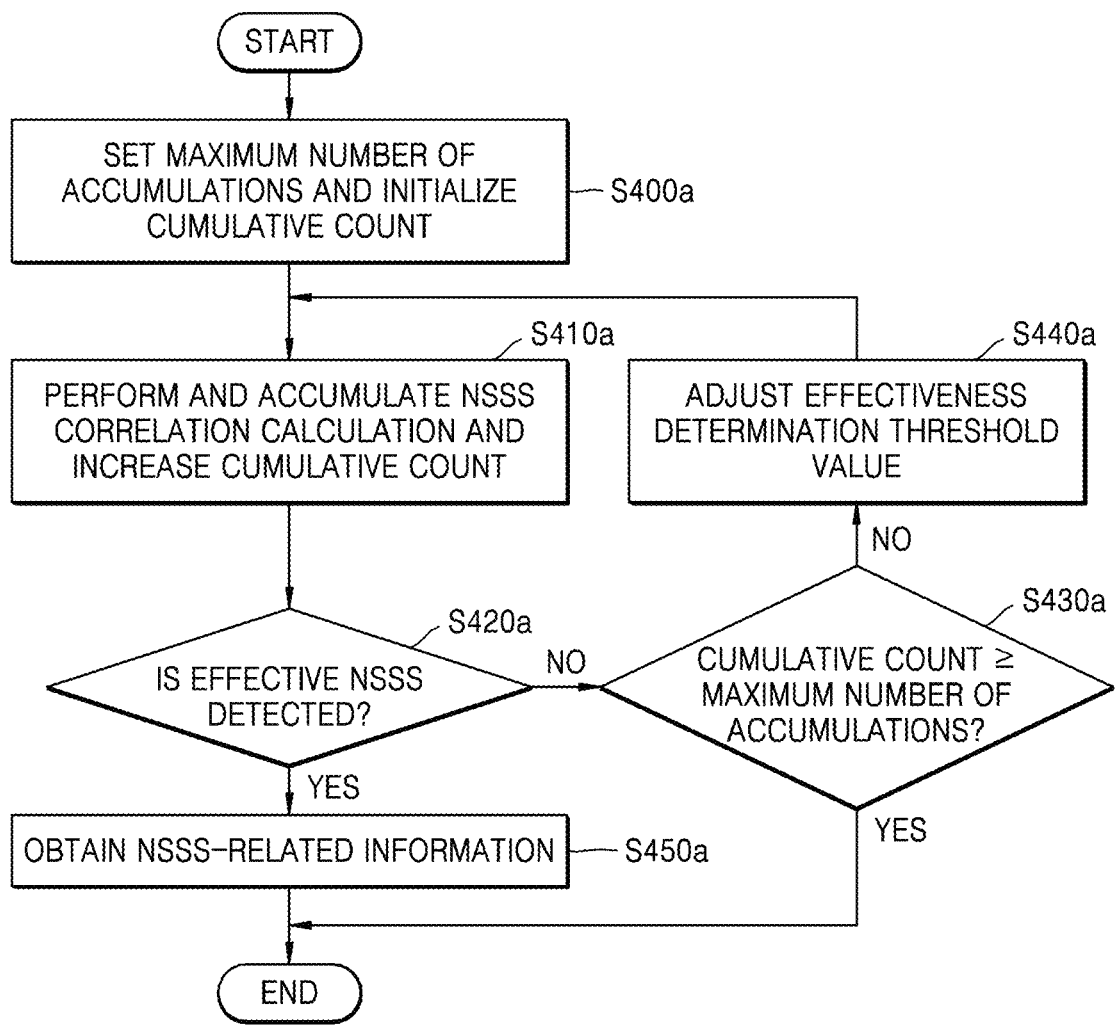
FIG. 13 is a flowchart of operations of an NSSS detector, according to an exemplary embodiment of the inventive concept.

FIG. 13 is a flowchart of operations of an NSSS detector, according to an exemplary embodiment of the inventive concept.

Referring to FIG. 13, in operation S400a, the NSSS detector 150 sets the maximum number of accumulations S_max and initializes the cumulative count. Then, in operation S410a, the NSSS detector 150 performs the NSSS correlation calculation between each sub-frame and the NSSS reference signals S_ref and accumulates NSSS correlation calculation results as the second cumulative values S_ac, thereby increasing the cumulative count. Next, in operation S420a, the NSSS detector 150 determines whether the effective NSSS is detected based on the second cumulative values S_ac. When the effective NSSS is detected, the NSSS detector 150 may detect the effective NSSS as an NSSS for cell searching and may obtain the NSSS-related information S_inf.

In operation S430a, when an effective NSSS is not detected, the NSSS detector 150 determines whether a current cumulative count is equal to or greater than the maximum number of accumulations S_max. When the current cumulative count is equal to or greater than the maximum number of accumulations S_max, the NSSS detector 150 terminates the NSSS detection operation.

In operation S440a, when the current cumulative count is less than the maximum number of accumulations S_max, the NSSS detector 150 adjusts an effectiveness determination threshold value on which the detection of the effective NSSS is based. In an exemplary embodiment, the NSSS detector 150 adjusts the effectiveness determination threshold value based on the cumulative count. For example, the NSSS detector 150 may set a size of the effectiveness determination threshold value to be small as the cumulative count increases. For example, the adjustment of the effectiveness determination threshold value may be performed by the NSSS controller 157 based on the cumulative count.

In operation S450a, when the effective NSSS is detected or the current cumulative count is equal to or greater than the maximum number of accumulations S_max, the NSSS detector 150 obtains NSSS-related information.

Figure 14:
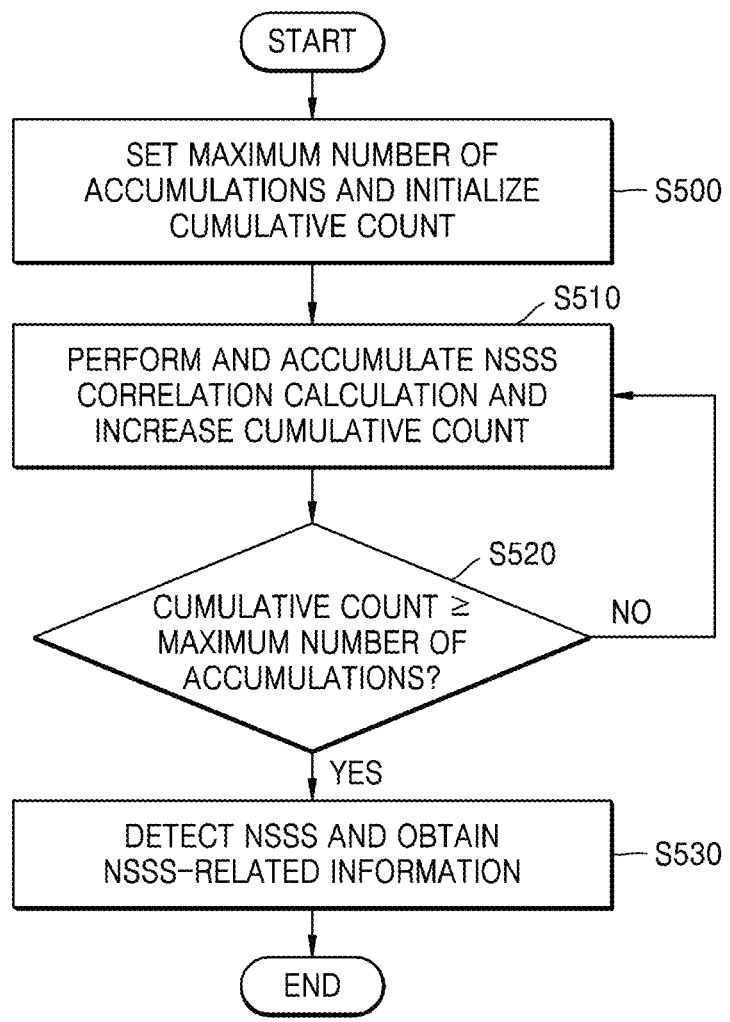
FIG. 14 is a flowchart of operations of an NSSS detector, according to an exemplary embodiment of the inventive concept.

FIG. 14 is a flowchart of operations of an NSSS detector 150, according to an exemplary embodiment of the inventive concept.

Referring to FIG. 14, in operation S500, the NSSS detector 150 sets the maximum number of accumulations S_max and initializes the cumulative count. Then, in operation S510, the NSSS detector 150 performs an NSSS correlation calculation between each sub-frame and NSSS reference signals C_ref and accumulates NSSS correlation calculation results as the second cumulative values S_ac, thereby increasing the cumulative count.

In operation S520, the NSSS detector 150 determines whether the current cumulative count is equal to or greater than the maximum number of accumulations S_max. When the current cumulative count is less than the maximum number of accumulations S_max, the NSSS detector 150 resumes operation S510. Otherwise, in operation S530, when the current cumulative count is equal to or greater than the maximum number of accumulations S_max, the NSSS detector 150 detects the NSSS based on the second cumulative values corresponding to the cumulative count and may obtain NSSS-related information. Accordingly, when the NPSS is detected by adaptively changing the number of accumulations and then the NSSS is detected based on the detected NPSS, the NSSS may be detected when the cumulative count becomes equal to the maximum number of accumulations.

Figure 15:
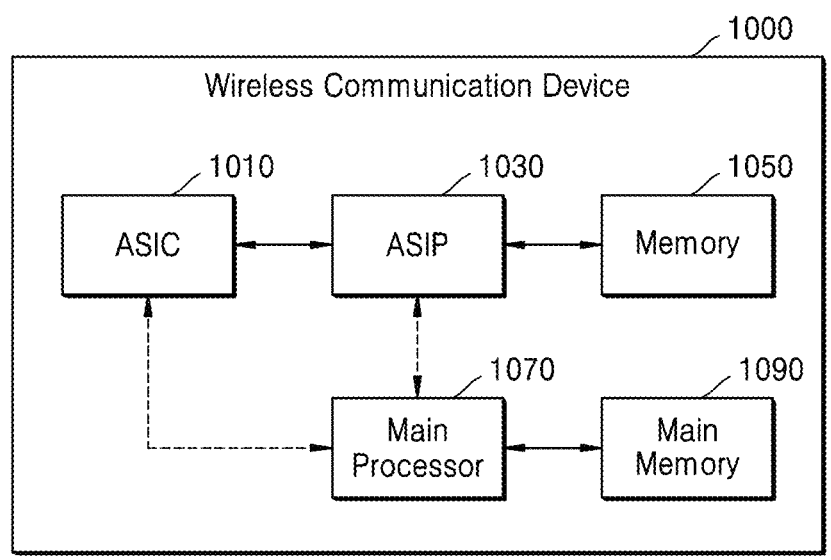
FIG. 15 is a block diagram of a communication device, according to an exemplary embodiment of the inventive concept.

FIG. 15 is a block diagram of a communication device according to an exemplary embodiment of the inventive concept.

Referring to FIG. 15, a wireless communication device 1000 as an example of the communication device may include an application specific integrated circuit (ASIC) 1010, an application specific instruction set processor (ASIP) 1030, a memory 1050, a main processor 1070, and a main memory 1090. At least two of the ASIC 1010, the ASIP 1030, and the main processor 1070 may communicate with one another. Also, at least two of the ASIC 1010, the ASIP 1030, the memory 1050, the main processor 1070, and the main memory 1090 may be embedded in one chip.

The ASIP 1030 may be an integrated circuit that is customized for special purposes, support instruction sets that are exclusive to certain applications, and execute instructions in the instruction sets. The memory 1050 may communicate with the ASIP 1030 and may store, as a non-transitory storage medium, instructions executed by the ASIP 1030. The memory 1050 may include an arbitrary type of memory, for example, random access memory (RAM), read only memory (ROM), tape, a magnetic disk, an optical disk, volatile memory, non-volatile memory, or a combination thereof, which is accessible by the ASIP 1030. The ASIP 1030 or the main processor 1070 may execute a series of instructions stored in the main memory 1090 to detect the NPSS and the NSSS from the wireless signal and to search for cells based on the detected NPSS and NSSS, as described with reference to FIGS. 1 to 14.

The main processor 1070 may execute instructions to control the wireless communication device 1000. For example, the main processor 1070 may control the ASIC 1010 or the ASIP 1030 and may process data, which is received via a wireless communication network, or user inputs to the wireless communication device 1000. The main memory 1090 may communicate with the main processor 1070 and may store, as a non-transitory storage medium, instructions executable by the main processor 1070.

While the inventive concept has been particularly shown and described with reference to exemplary embodiments thereof, it will be understood that various changes in form and details may be made therein without departing from the spirit and scope of the inventive concept.

What is claimed is:

1. A method of operating a wireless communication device, the method comprising:
   receiving a wireless signal comprising a plurality of frames, wherein each of the plurality of frames comprises a plurality of sub-frames, and a current frame is initially a first one of the frames, and setting a maximum number of accumulations regarding an operation of accumulating correlation values;
   a) performing a correlation calculation between each of the sub-frames of the current frame and a plurality of reference signals to generate a plurality of current correlation values, wherein the plurality of reference signals are narrow primary synchronization signals (NPSS);
   b) respectively accumulating the current correlation values with previous correlation values to generate current cumulative values respectively corresponding to the plurality of sub-frames of the current frame;
   c) comparing a ratio related to a peak value derived from the current correlation values and an effectiveness determination threshold adjusted according to the number of times step b) is performed;
   determining whether an effective synchronization signal is detected, based on a comparison result of the comparing; and setting the current frame to a next one of the frames, setting the previous correlational values to the current correlation values, and determining whether to resume to step a) based on the determination as to whether the effective synchronization signal is detected;
   and when a number of times that the accumulating is performed is less than the maximum number of accumulations, obtain frame boundary information from the effective synchronization signal when the effective synchronization signal is detected.

2. The method of claim 1, further comprising wherein the determining of whether to resume to step a) comprises: resuming to step a) when a number of times that the accumulating is performed is less than the maximum number of accumulations and when the effective synchronization signal is not detected.

3. The method of claim 1, wherein the determining of whether the effective synchronization signal is detected comprises: deriving a first value based on a peak of the current cumulative values and a statistical value of the current cumulative values; and determining of whether the effective synchronization signal is detected, based on a result of comparing the first value with an effectiveness determination threshold value.

4. The method of claim 3, wherein the statistical value is a minimum value among the current cumulative values, and the first value is a peak-to-main ratio.

5. The method of claim 3, wherein the statistical value is an average of the current cumulative values, and the first value is a peak-to-average ratio.

6. The method of claim 3, further comprising adjusting the effectiveness determination threshold value based on the number of times that the accumulating is performed.

7. The method of claim 3, further comprising adjusting the effectiveness determination threshold value based on a false alarm ratio when the effective synchronization signal is detected.

8. The method of claim 3, further comprising adjusting the effectiveness determination threshold value based on channel information used to receive the wireless signal.

9. The method of claim 1, wherein the determining of whether the effective synchronization signal is detected comprises determining whether an effective NPSS is detected from the current cumulative values.

10. The method of claim 1, wherein the plurality of reference signals are narrow secondary synchronization signals (NSSS), and the determining of whether the effective synchronization signal is detected comprises determining whether an effective NSSS is detected from the current cumulative values.

11. A cell searching method of a wireless communication device comprising:
   receiving a wireless signal in which occurrence of each of a narrow primary synchronization signal (NPSS) and a narrow secondary synchronization signal (NSSS) is defined at preset time intervals;

setting a first maximum number of accumulations regarding an operation of accumulating NPSS correlation values, wherein the wireless signal comprises a first frame including a plurality of sub-frames;

calculating first NPSS correlation values by performing an NPSS correlation calculation between each sub-frame of the first frame and a plurality of NPSS reference signals;

respectively accumulating the first NPSS correlation values with previous NPSS correlation values to generate first cumulative values, where the accumulating comprises, for each sub-frame, adding the first NPSS correlation value of the sub-frame at a position within the first frame to the previous NPSS correlation value of a sub-frame at the same position within a previous frame;

determining whether an effective NPSS is detected based on the first cumulative values; wherein the detecting of whether the effective NPSS is detected comprises: deriving a first effectiveness determination threshold value based on the first number of accumulations; and determining whether the effective NPSS is detected, based on a comparison between the first cumulative values and the first effectiveness determination threshold value;

and when a first number of accumulations, which is obtained when the first NPSS correlation values are respectively accumulated to generate the first cumulative values, is less than the first maximum number of accumulations, obtaining frame boundary information from the effective NPSS when the effective NPSS is detected.

12. The cell searching method of claim 11, further comprising: when the effective NPSS is not detected, calculating second NPSS correlation values by performing the NPSS correlation calculation between each sub-frame of a second frame of the wireless signal and each of the NPSS reference signals; and respectively accumulating the second NPSS correlation values with the first NPSS correlation values to generate the first cumulative values, wherein the second frame includes a plurality of sub-frames.

13. The cell searching method of claim 11, further comprising: predicting a location of the NSSS based on the frame boundary information; calculating first NSSS correlation values by performing a NSSS correlation calculation between each sub-frame of a second frame of the wireless signal and each of a plurality of NSSS reference signals, based on the predicted location; and respectively accumulating the first NSSS correlation values with previous NSSS correlation values to generate second cumulative values; and detecting the NSSS based on the second cumulative values, wherein the second frame includes a plurality of sub-frames.

14. The cell searching method of claim 13, further comprising: setting a second maximum number of accumulations regarding the accumulating of the first NSSS correlation values to generate the second cumulative values, wherein the detecting of the NSSS comprises: determining whether an effective NSSS is detected based on the second cumulative values; and when a second number of accumulations, which is obtained when the first NSSS correlation values are respectively accumulated to generate the second cumulative values, is less than the second maximum number of accumulations, obtaining cell ID information from the effective NSSS when the effective NSSS is detected.

15. The cell searching method of claim 14, wherein the determining of whether the effective NSSS is detected comprises: deriving a second effectiveness determination threshold value based on the second number of accumulations; and determining whether the effective NSSS is detected based on a comparison between the second cumulative values and the second effectiveness determination threshold value.

16. A wireless communication device comprising: an antenna receiving a wireless signal comprising a plurality of frames in which an occurrence of each of a narrow primary synchronization signal (NPSS) and a narrow secondary synchronization signal (NSSS) is defined at preset time intervals, wherein each of the plurality of frames comprises a plurality of sub-frames;

an NPSS correlator configured to output NPSS correlation values by performing an NPSS correlation calculation on a current frame among the frames, based on the plurality of sub-frames of the current frame and a plurality of NPSS reference signals;

an NPSS combiner configured to respectively accumulate the NPSS correlation values to generate first cumulative values respectively corresponding to the plurality of sub-frames of the current frame, where for each sub-frame of the current frame, the accumulate adds the NPSS correlation value of the sub-frame at a position within the current frame to an NPSS correlation value of a sub-frame at the same position within a previous frame; and an NPSS controller configured to determine, based on the first cumulative values, whether an effective NPSS is detected, and output a control signal for controlling the NPSS correlator, based on the determination as to whether the effective NPSS is detected;

wherein the NPSS controller is further configured to: receive a first maximum number of accumulations that is set in advance; and when a number of times that the NPSS combiner performs the accumulating is less than the first maximum number of accumulations, obtain frame boundary information from the effective NPSS when the effective NPSS is detected;

and wherein the NPSS controller is further configured to calculate an effectiveness determination threshold value based on the number of times, perform a comparison using the first cumulative values and the effectiveness determination threshold value to determine whether the effective NPSS is detected.

17. The wireless communication device of claim 16, wherein the NPSS controller is further configured to control the NPSS correlator to perform the NPSS correlation calculation on a next one of the frames because the effective NPSS is not detected.

* * * * *